(12) United States Patent
Yagisawa et al.

(10) Patent No.: US 6,582,001 B2
(45) Date of Patent: Jun. 24, 2003

(54) VEHICLE REAR STRUCTURE

(75) Inventors: Katsuichi Yagisawa, Saitama (JP); Junji Kikuno, Saitama (JP); Kengo Yano, Saitama (JP); Akihiko Yamashita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/101,616

(22) Filed: Mar. 21, 2002

(65) Prior Publication Data
US 2002/0139596 A1 Oct. 3, 2002

(30) Foreign Application Priority Data
Mar. 28, 2001 (JP) ........................................ 2001-094367

(51) Int. Cl.⁷ ............................... B60R 9/06; B62J 6/04; F21V 33/00; B60Q 1/38; B60Q 1/44
(52) U.S. Cl. ........................ 296/37.1; 362/473; 362/543
(58) Field of Search ......................... 296/37.1; 362/473, 362/543, 548

(56) References Cited

U.S. PATENT DOCUMENTS

| 3,643,081 | A | * | 2/1972 | Szeles | |
|---|---|---|---|---|---|
| 4,690,237 | A | * | 9/1987 | Funabashi et al. | 180/219 |
| 6,332,639 | B1 | * | 12/2001 | Tanaka et al. | 296/37.1 |
| 6,364,512 | B1 | * | 4/2002 | Logel | 362/548 |
| 6,402,356 | B2 | * | 6/2002 | Gotou | 362/543 |
| 6,428,076 | B2 | * | 8/2002 | Sumada et al. | 296/37.1 |
| 6,428,191 | B2 | * | 8/2002 | Ohura | 362/473 |
| 2002/0008397 | A1 | * | 1/2002 | Takahashi | 296/37.1 |
| 2002/0153693 | A1 | * | 10/2002 | Ohura | 280/281.1 |

FOREIGN PATENT DOCUMENTS

| JP | 4-92732 | * | 3/1992 | .................. 362/473 |
|---|---|---|---|---|
| JP | 10-203449 | | 8/1998 | |

* cited by examiner

*Primary Examiner*—D. Glenn Dayoan
*Assistant Examiner*—Hilary Gutman
(74) *Attorney, Agent, or Firm*—Birch, Stewart, Kolasch & Birch, LLP

(57) ABSTRACT

The rear combination lamp is set closer to the storage box by providing left and right pairs of bulbs, and bulbs forming left and right access openings for performing maintenance of the bulbs on the lower box, and closing the access openings with lids respectively. Since maintenance work of the bulbs can easily be made from the inside of the storage box and the rear combination lamp may be set closer to the storage box, the rear portion of the vehicle may be formed compact in configuration even when a large rear combination lamp is disposed rearward of a large storage box. Therefore, the width or the entire length of the rear portion of the vehicle body is not increased, and thus the appearance and operability of the vehicle may be improved.

20 Claims, 19 Drawing Sheets

VEHICLE REAR STRUCTURE

CROSS-REFERENCE TO RELATED APPLICATIONS

This nonprovisional application claims priority under 35 U.S.C. §119(a) on Patent Application No. 2001-094367 filed in Japan on Mar. 28, 2001.

BACKGROUND OF THE INVENTION

1. Field of the Invention

The present invention relates to a rear structure of a vehicle suitable for improving maintenance of a rear combination lamp and slimming up of the rear portion of the vehicle.

2. Description of Background Art

A vehicle rear structure having a rear combination lamp disposed at the rear of the storage box of the vehicle such as a motorcycle, for example, a structure having a lamp 70 mounted on the outer wall 54a of the rear portion of the storage box 50 with a plurality of screws is shown in FIG. 2 of Japanese Patent Laid Open No.203449/1998 "LAMP MOUNTING STRUCTURE FOR THE REAR OF VEHICLES" (the following reference numerals are quoted from the aforementioned patent publication, hereinafter).

When a lamp 70 is mounted on the outer wall 54a of the rear portion of the storage box 50, the lamp 70 must be removed from the storage box 50 when replacing the bulb of the lamp 70. In addition, when a structure in which the bulb is attached and detached from the space between the storage box 50 and the lamp 70 is employed, a significantly large space for inserting a hand must be provided between the storage box 50 and the lamp 70.

In order to remove the lamp 70 from the storage box 50, a plurality of screws have to be loosened, and thus it takes a lot of time for removal. When a large space is provided between the storage box 50 and the lamp 70, for example, in the case where a storage box upsized for improving storing capability and a lamp upsized for improving visibility are disposed at the rear of the vehicle, the aforementioned large space may increase the size or the length of the rear portion of the vehicle, which may influence on upsizing or appearance of the vehicle.

SUMMARY OF THE INVENTION

Accordingly, it is an object of the present invention to improve maintenance of the lamp at the rear of the vehicle and to slim up of the rear portion of the vehicle by improving the vehicle rear structure.

In order to achieve the aforementioned object, the invention according to a first aspect is a vehicle rear structure in which a storage box is disposed below the hinged seat, and a rear combination lamp is disposed at the rear of the storage box, wherein the rear combination lamp is set closer to the storage box by providing a pair of left and right bulbs on the rear combination lamp, forming left and right access openings for performing maintenance of the bulbs on the storage box, and closing the access openings with lids.

Providing left and right access opening for maintenance of the bulb on the storage box facilitates maintenance work such as replacement of the bulb or the like from the inside of the storage box, and enables the rear combination lamp to be set closer to the storage box, so that even when a large rear combination lamp is disposed at the rear of a large storage box, a compact design of the rear portion of the vehicle is realized.

The present invention according to a second aspect includes the lamp axis passing through the center of the bulb being inclined with respect to the longitudinal axis of the vehicle body.

By employing a structure in which the lamp axis is inclined with respect to the longitudinal axis of the vehicle body, for example, the lamp axis can be inclined in the direction that facilitates maintenance of the bulb through the access opening.

The present invention according to a third aspect includes the left and right lamp axes are directed so as to fan out toward the front.

By directing the left and right lamp axes so as to fan out toward the front, a large massed space can be reserved between the left and right bulbs of the rear combination lamp, and thus the storage box can be extended toward the rear, so that the volume of the storage box may be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
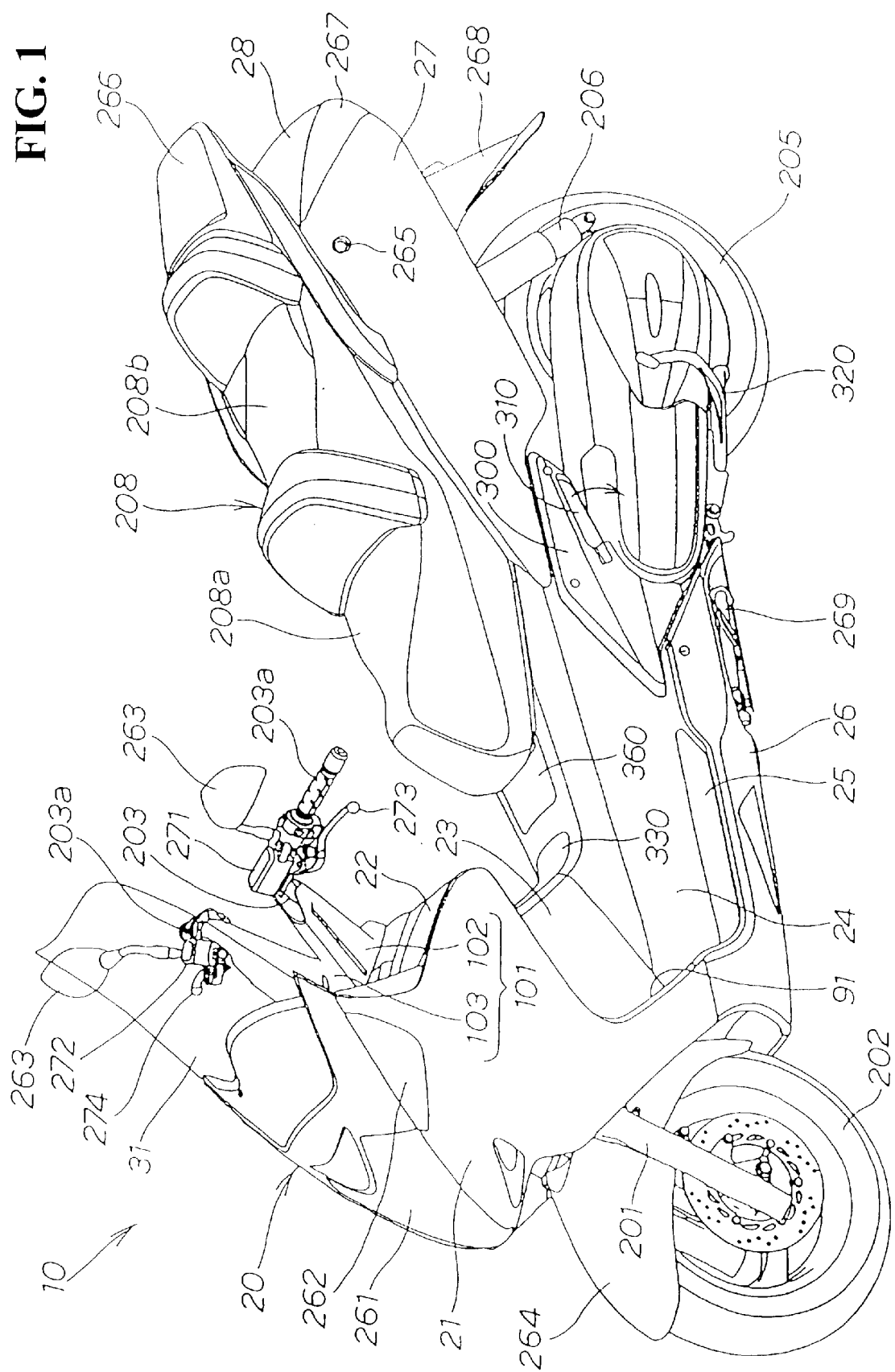
FIG. 1 is a front perspective view of the left side of the vehicle employing the rear structure according to the present invention.

Referring now to the attached drawings, embodiments of the present invention will be described below. The terms "front", "rear," "left," "right," "upward" and "downward" represent the directions as viewed from the driver. The figures are to be viewed in the direction in which the reference numerals are oriented.

FIG. 1 is a perspective view of the left side of the vehicle employing the rear structure according to the present invention. The vehicle in FIG. 1 is a scooter type motorcycle 10 having a low deck floor 25.

The vehicle body cover 20 for covering the entire vehicle body frame of the motorcycle 10 includes a front cowl 21 for covering the front portion of the vehicle body frame and the upper portion of the front wheel. The front cowl 21 will be described hereinbelow. An upper cover 22 covers the upper opening of the front cowl 21. An inner cover 23 covers the rear portion of the front cowl 21. A center cover 24 extends rearward from the rear end of the inner cover 23 and covers the longitudinal center of the vehicle body frame. A low deck floor 25 extends outward from the outer edge of the lower end of the center cover 24 for placing the feet of the driver. A floor skirt 26 extends downward from the outer edge of the low deck floor 25. A rear side cover 27 extends rearward from the center cover 24 and covers the rear side portion of the vehicle body frame. A rear cover 28 extends rearward from the rear edge of the rear side cover 27 and covers the rear portion of the vehicle body frame.

The front cowl 21 includes a transparent windscreen 31 thereon. The inner cover 23 includes a leg shield 91 for covering the front side of the driver's legs.

The motorcycle 10 includes a handle 203 at the front of the vehicle body and a seat 208 and a step holder 300 at the rear of the vehicle body.

The handle 203 has a configuration similar to the so-called chopper-type handle. Accordingly, the handle 203 includes grips 203a, 203a at relatively high positions and extends rearward. The handle 203 is covered by a handle cover 101. The handle cover 101 includes a lower handle cover 102 for covering the lower portion of the handle 203 on the left and right sides, and an upper handle cover 103 for covering the upper portion of the handle 203.

The seat 208 is a double seat comprising a front portion 208a of the seat for a driver and the rear portion 208a of the seat for an occupant. The step holder 300 is disposed adjacent the rear portion of the center cover 24 and is provided with a pillion step 310 for placing the occupant's foot (step for occupant) mounted in such a manner that it can be stored and exposed.

In FIG. 1, reference numeral 261 designates a headlamp, reference numeral 262 designates a blinker, reference numerals 263, 263 designate mirrors, reference numeral 264 designates a front fender, reference numeral 265 designates a seat lock, reference numeral 266 designates a rear air spoiler, reference numeral 267 designates a rear combination lamp, reference numeral 268 designates a rear fender, reference numeral 269 designates an auxiliary stand, and reference numeral 320 designates a main stand.

Reference numerals 271, 272 designate master cylinders for generating a liquid pressure for braking by the operation of brake levers 273, 274.

Figure 2:
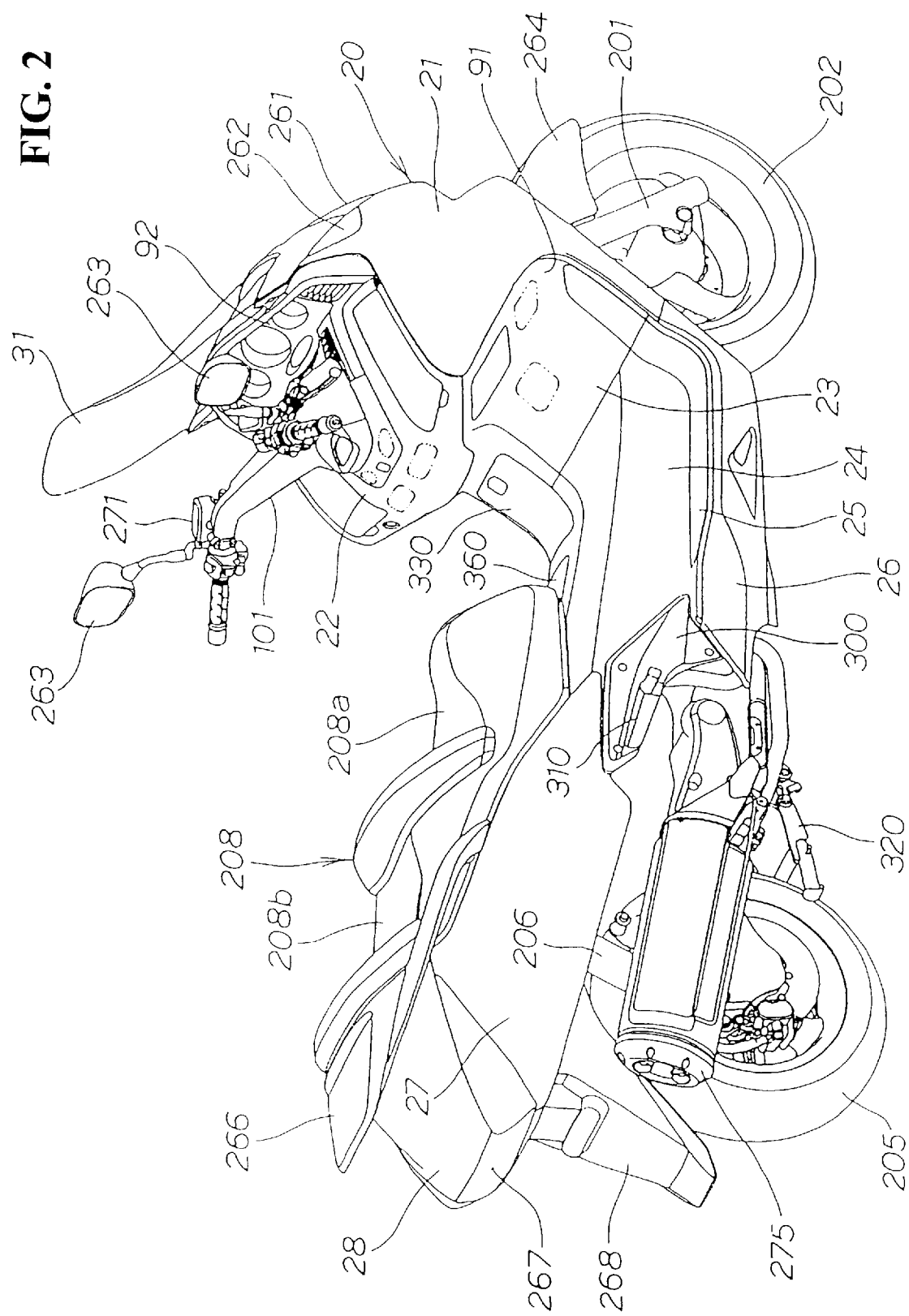
FIG. 2 is rear perspective view showing the right side of the motorcycle according to the present invention.

FIG. 2 is a perspective view showing the right side of the motorcycle according to the present invention. A meter panel 92 is provided above the front cowl 21 behind the windscreen 31. As is clear from the description given so far, the front portion of the vehicle body may be provided with the windscreen 31, the leg shield 91, and the meter panel 92.

FIG. 2 also illustrates that another step holder 300 having another pillion step 310 is provided on the right side of the motorcycle 10. The reference numeral 275 designates an exhaust muffler.

Figure 3:
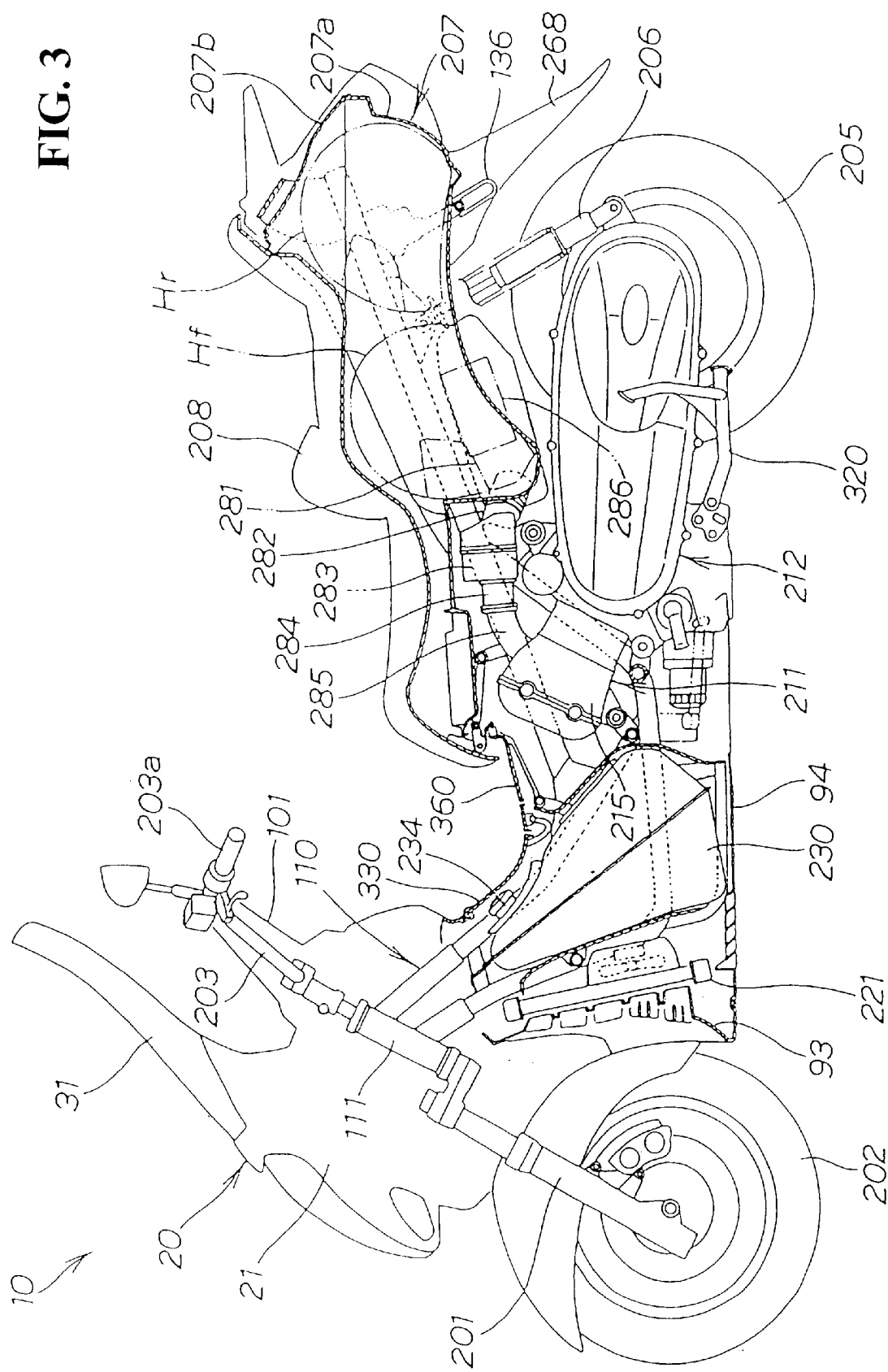
FIG. 3 is a sectional side elevation of the motorcycle according to the present invention.

FIG. 3 is a sectional side elevation of the motorcycle according to the present invention, viewed from the left side of the motorcycle 10.

The motorcycle 10 is a scooter type vehicle mainly comprising a vehicle body frame 110. A front fork 201 is mounted on the head pipe 111 of the vehicle body frame 110 so as to be capable of lateral swinging motion. A front wheel 202 is mounted on the front fork 201. The handle 203 is connected to the front fork 201. An engine 211 is mounted on the rear portion of the vehicle body flame 110. A power transmission mechanism 212 is mounted for vertical swinging motion about a crankshaft of the engine 211. A rear wheel 205 is mounted on the rear portion of the power transmission mechanism 212. A rear cushion unit 206 suspends the rear end portion of the power transmission mechanism 212 from the vehicle body frame 110. A storage box 207 is mounted over the rear portion of the vehicle body frame 110. The seat 208 is hingedly arranged on the storage box 207.

The front fork 201 is in the shape of an inverted angular U disposed below the head pipe 111. The upper portion of the front fork 201 and the head pipe 111 are covered by the front cowl 21.

The engine 211 is a water-cooled 2-cylinder engine slightly inclined with two left and right cylinder heads 215 facing toward the upper front, and disposed substantially horizontally. The power transmission mechanism 212 is a belt converter non-stage transmission with a centrifugal clutch in which the power of the engine 211 is transmitted to the rear wheel 205.

The storage box 207 is a box elongated in the direction along the length of the vehicle body so that two helmets Hf, Hr can be stored in tandem, and comprises a lower box 207a and an upper box 207b placed on the rear portion of the lower box 207a.

In FIG. 3, reference numeral 281 designates an air cleaner, reference numeral 282 designates a connecting tube, reference numeral 283 designates an air chamber, reference numeral 284 designates a throttle valve, reference numeral 285 designates an inlet pipe, and reference numeral 286 designates a battery.

Figure 4:
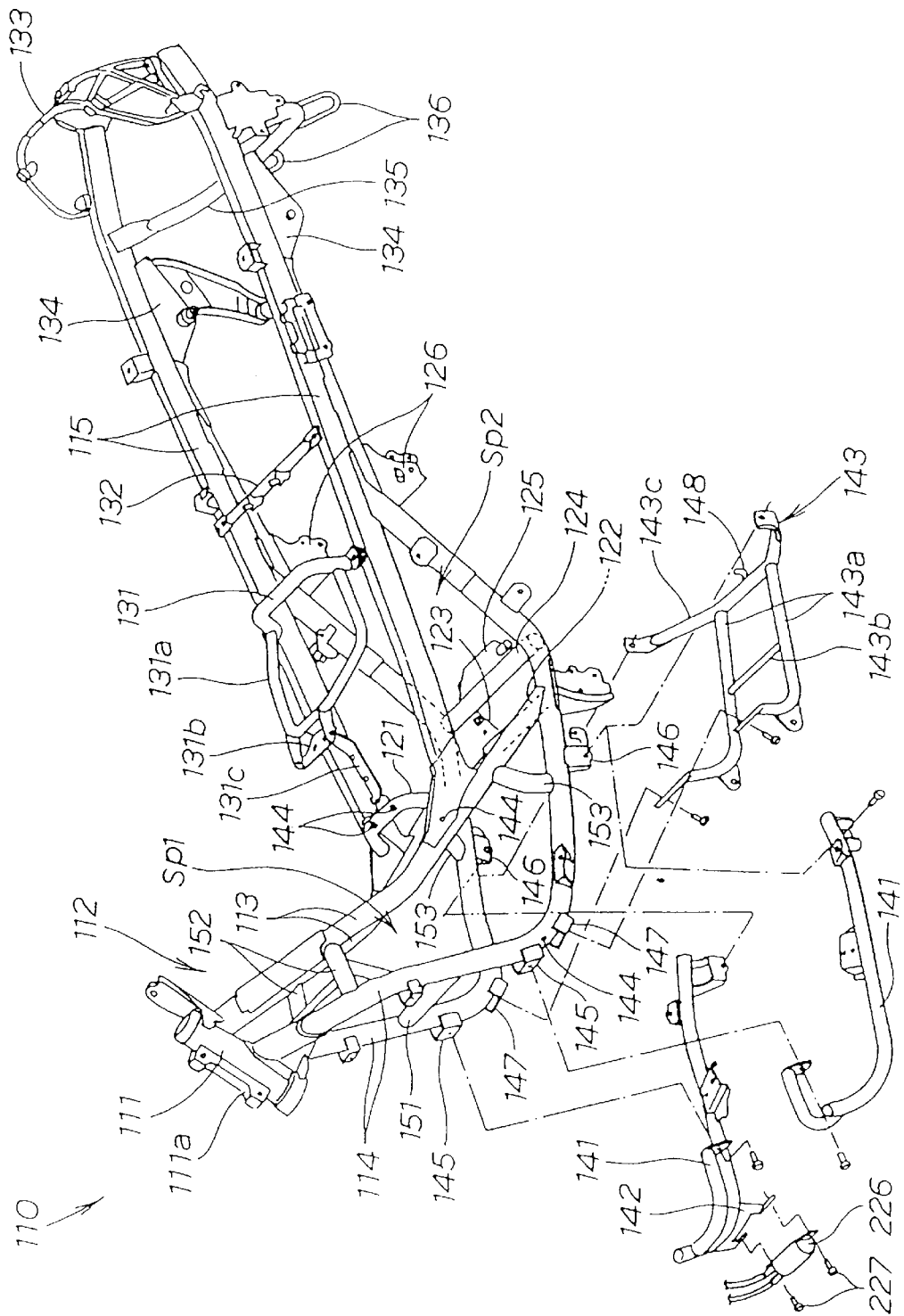
FIG. 4 is a perspective view of the vehicle body frame of the motorcycle according to the present invention.

FIG. 4 is a perspective view of the vehicle body frame of the motorcycle according to the present invention. The vehicle body frame 110 is a double cradle type integral frame including a front frame 112 continuing to the head pipe 111 and a pair of left and right rear frames 115, 115 extending rearward from the rear portion of the front frame 112 and joined by welding. The head pipe 111 is provided with a cowl stay bracket 111a.

The front frame 112 includes a pair of left and right upper frames 113, 113 extending downward toward the rear from the head pipe 111. A pair of left and right down tubes 114, 114 extend downward from the head pipe 111 at a position below the pair of upper frames 113, 113. The pair of down tubes 114, 114 extend rearward from lower ends thereof, and are connected to the lower ends of the pair of upper frames 113, 113. The pair of down tubes 114, 114 then extend upward toward the rear of the vehicle body frame 110. With the front frame 112 of such a construction, a substantially triangular space Sp1 in side view is defined by the pair of upper frames 113, 113 and the pair of down tubes 114, 114.

A first cross member 121 in the shape of an inverted angular U in front view is provided between the front end of a left rear frame 115 and the front end of a right rear frame 115. A second cross member 122 is provided between the lower end of the left upper frame 113 and the lower end of the right upper frame 113. A first engine bracket 123 is connected to the second cross member 122 at a center of the vehicle width.

A third cross member 124 is provided between the rear end of the horizontal portion of the left down tube 114 and the rear end of the horizontal portion of the right down tube 114. A second engine bracket 125 is connected to the third cross member 124 at the center of the vehicle width. Left and right third engine brackets 126, 126 are connected to rear ends of the left and right down tubes 114, 114.

Each of the pair of left and right rear frames 115, 115 is constructed of members having vertically elongated cross section. The pair of left and right rear frames 115, 115 is connected at one end thereof to the midsections along the lengths of the pair of left and right upper frames 113, 113. The pair of left and right rear frames 115, 115 extends rearward from opposite ends thereof. The language "vertically elongated cross section" means a cross section of which the longitudinal dimension is larger than the lateral dimension. More specifically, the rear frames 115, 115 are formed of square pipe of vertically elongated rectangular cross section.

The present invention is characterized in that three cross members 131–133 are detachably provided between the pair of left and right rear frames 115, 115. More specifically, a frontmost rear cross member 131, a middle rear cross member 132, and a rearmost rear cross member 133 are provided between the left and right rear frames 115, 115 in this order from the front.

The three cross members 131–133 are placed on the upper surface of the rear frames 115, 115 and are secured with bolts. Since the rear frames 115, 115 are of square pipe, it is easy to place and attach the three cross members 131–133 thereon.

The frontmost rear cross member 131 is a member in the shape of an inverted angular U in front view, having a U-shaped stay 131a opening toward the rear in plan view and extending forward from the left and right standing portions. A seat hinge supporting portion 131b is connected to the front end of the U-shaped stay 131a. An extension member 131c is connected to the front end of the U-shaped stay 131a so as to extend forward. The extension member 131c is secured at the front end thereof to the first cross member 121 with a bolt. The middle rear cross member 132 is a bar-shaped member, and is provided with a seat catch member, not shown, for holding the seat 208 (See FIG. 3) in the closed state. The rearmost rear cross member 133 is formed by aluminum die casting and is a U-shaped band member opening toward the front in plan view.

The increase in lateral rigidity of the rear frames 115, 115 is prevented in the case where the rear ends of the rear frames 115, 115 are connected by attaching the rearmost rear cross member 133 thereon with bolts. Accordingly, a good effect on the ride quality is provided. The rearmost rear cross member 133 is also provided with a seat catch member, not shown, for holding the seat 208 in the closed state. In other words, it is constructed in such a manner that the seat hinge 208c or the seat catch is removable with the cross members 131–133 from the vehicle body frame 110 by removing the tightened bolt.

The left and right rear frames 115, 115 are also provided with left and right cushion brackets 134, 134 connected at the rear portion thereof. A lower rear cross member 135 of substantially U-shape in front view is provided and welded between the rear portions of the left and right rear frames 115, 115. Left and right carrier hooks 136, 136 are connected to the lower rear cross member 135.

By forming the lower rear cross member 135 in the shape of a letter U, an increase in lateral rigidity in association with connection of the rear portions of the rear frames 115, 115 is prevented. Accordingly, the ride quality is increased.

FIG. 4 also shows that a pair of left and right floor supporting stays 141, 141 and an under frame 143 are detachably mounted on the vehicle body frame 110. A plurality of headed pins 144 are mounted thereon.

More specifically, the left and right floor supporting stays 141, 141 act as members for supporting the low deck floor 25 (See FIG. 1). The left and right floor supporting stays 141, 141 are attachable to the brackets 145, 145, 146, 146 of the left and right down tubes 114, 114 with bolts.

The right floor supporting stay 141 includes an ignition coil 226 for the engine detachably attached under the front end thereof via a stay 142 with bolts 227, 227. The ignition coil 226 attached under the down tube 114 is to be arranged below the level of the low deck floor 25.

The under frame 143 is a member provided between the horizontal portions of the left and right down tubes 114, 114 so as to be suspended therefrom. The under frame 143 is attachable to the brackets 146, 146, 147, 147 of the down tubes 114, 114 with bolts.

The under frame 143 in such a construction includes left and right side members 143a, 143a extending along the horizontal portions of the down tubes 114, 114. A central cross member 143b is provided between the elongated central portions of the side members 143a, 143a. A rear cross member 143c is provided between the rear ends of the side members 143a, 143a. The reference numeral 148 is a hook for hooking a heat shielding plate for the fuel tank, which will be described later.

The headed pins 144 are members for hooking the heat shielding plate for the fuel tank, which will be described later. Six headed pins in total are provided at the outside portions of the left and right upper frames 113, 113 and the outside portions of the left and right down tubes 114, 114, and on the front portion of the first cross member 121 on the left and right positions. In FIG. 4, the reference numeral 151 designates a front cross member, and the numerals 152, 152 and 153 designate stays.

Figure 5:
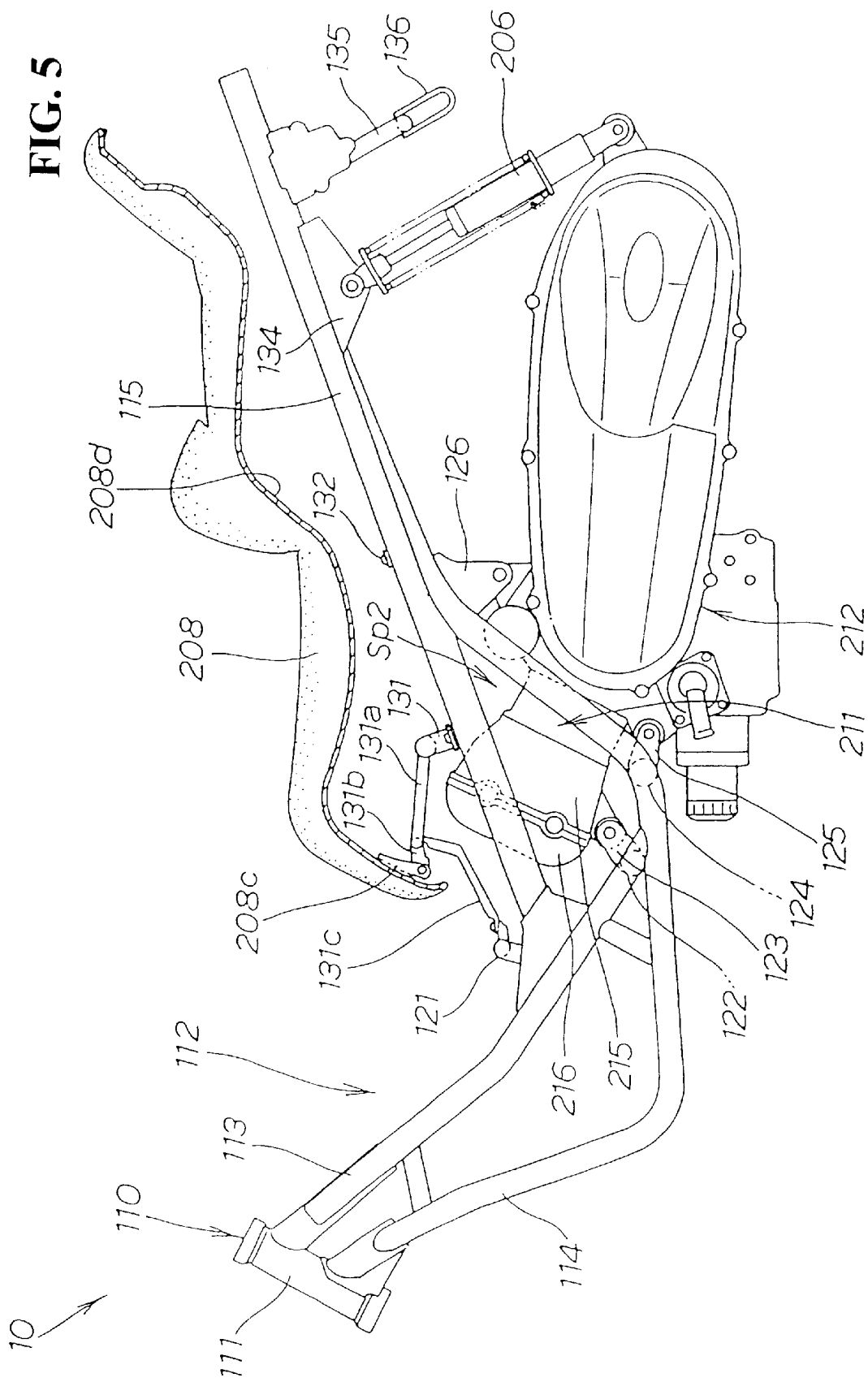
FIG. 5 is a left side view of the vehicle body frame, the engine, the power transmission mechanism, and a seat of the motorcycle according to the present invention.

FIG. 5 is a left side view of the vehicle body frame, the engine, the power transmission mechanism, and a seat of the motorcycle according to the present invention, showing a state in which the engine 211 and the power transmission mechanism 212 are arranged rearwardly of the front frame 112 and downwardly of the pair of rear frames 115, 115. The engine 211 is attached in the vicinity of the connecting portions between the front frame 112 and the left and right rear frames 115, 115 (only the, left one of them is shown in the figure, hereinafter).

More specifically, a substantially triangular space Sp2 in side view is defined by the pair of upper frames 113, 113, the pair of down tubes 114, 114, and the pair of rear frames 115, 115 at the rear of the front frame 112. A cylinder head 215 and a head cover 216 of the engine 211 are arranged in the space Sp2. The lower front portion of the engine 211 is attached to the first engine bracket 123, the lower rear portion of the engine 211 is attached to the second engine bracket 125, and the upper rear portion of the engine 211 is attached to the third engine brackets 126, 126. The frontmost and middle rear cross members 131, 132 are arranged above the engine 211.

FIG. 5 also shows that (1) the rear end portion of the power transmission mechanism 212 is suspended by the left and right cushion brackets 134, 134 via the left and right rear cushion units 206, 206, and (2) the frontmost rear cross member 131 also serves as a member for supporting the movable portion of the seat hinge 2082 of the hinged seat 208. In this way, the rear cushion units 206, 206 and the seat 208 can be supported by the rear frames 115, 115. The reference numeral and sign 208d designate a seat bottom plate provided at the bottom portion of the seat 208.

Figure 6:
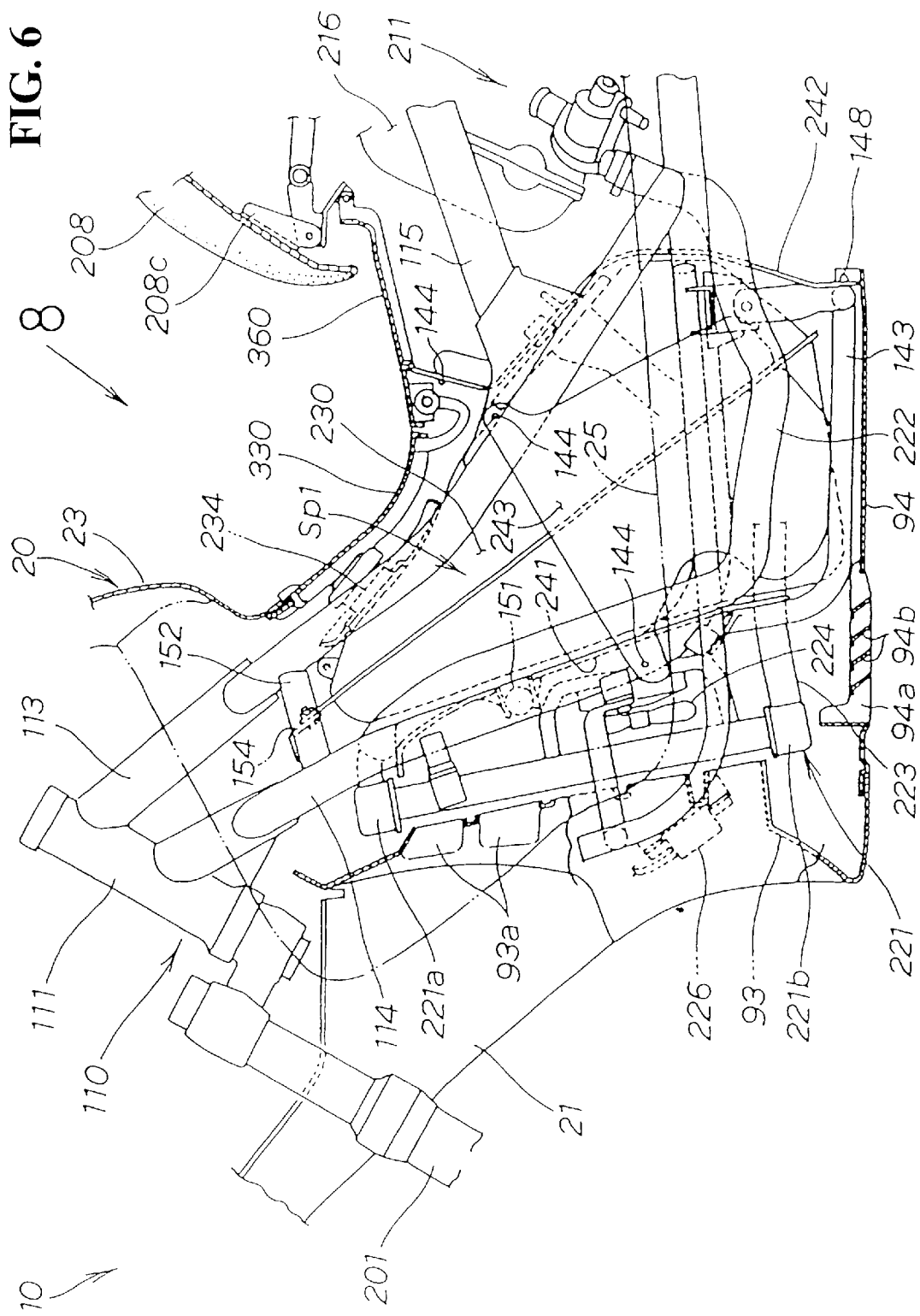
FIG. 6 is a sectional side elevation of the front lower portion of the motorcycle according to the present invention.

FIG. 6 is a sectional side elevation of the front lower portion of the motorcycle according to the present invention viewed from the left side of the motorcycle 10, and showing a state in which the engine 211 is disposed at the rear of the low deck floor 25, which is shown in phantom. A radiator 221 for cooling the engine is disposed at the front of the floor 25. The ignition coil 226 is disposed under the front portion of the floor 25. The fuel tank 230 is disposed between the engine 211 and the radiator 221.

In other words, the radiator 221 is disposed forwardly of the engine 211 and the left and right down tubes 114, 114 (only the left one of them is shown in the figure, hereinafter).

The return pipe 222 for returning the coolant from the engine 211 to the radiator 221 is a hose passing along the left side (the near side of the figure) of the vehicle body with respect to the center of the vehicle width. More specifically, the return pipe 222 is connected to the liquid return port of the engine 211 and extends along the horizontal portion of the left down tube 114 and then the vertically extending portion at the front thereof, and is connected to the upper header 221a of the radiator 221.

On the other hand, the feed pipe 223 for feeding the coolant from the radiator 221 to the engine 211 is a hose passing along the right side (the far side in the figure) of the vehicle body with respect to the center of the vehicle width. More specifically, the feed pipe 223 is connected to the lower header 221b of the radiator 221 and extends rearward along the horizontal portion of the right down tube 114 (on the far side in the figure) and is connected to the liquid port of the engine 211. The reference numeral 224 designates a radiator fan.

The ignition coil 226 is characterized by being arranged on the right side opposite from the return pipe 222 with respect to the center of the vehicle width (the far side in the figure) and forwardly of the radiator 221.

In this way, the ignition coil 226 may be disposed at the position which is free from (1) thermal effect from the engine 211, (2) thermal effect from the exhaust air from the radiator 221, and (3) thermal effect from the return pipe 222.

The fuel tank 230 is disposed in the substantially triangular space Sp1 in side view, which is defined by the pair of left and right upper frames 113, 113 and the pair of left and right down tubes 114, 114. The fuel tank 230 is a container having such a configuration that the upper front is tapered along the upper frames 113, 113 and the down tubes 114, 114 when viewed from the side of the vehicle body as shown in the figure in order to utilize the space Sp1 effectively for arrangement. The lower portion of fuel tank 230 extends downward to the level below the down tubes 114, 114. The fuel tank 230 may be protected by covering the lower portion of the fuel tank 230, which extends downward to the level below the down tubes 114, 114 with the detachable under frame 143.

The under frame 143 is mounted to the vehicle body frame 110 after the fuel tank 230 is inserted and attached into the space Sp1 from below the vehicle body frame 110.

Figure 7:
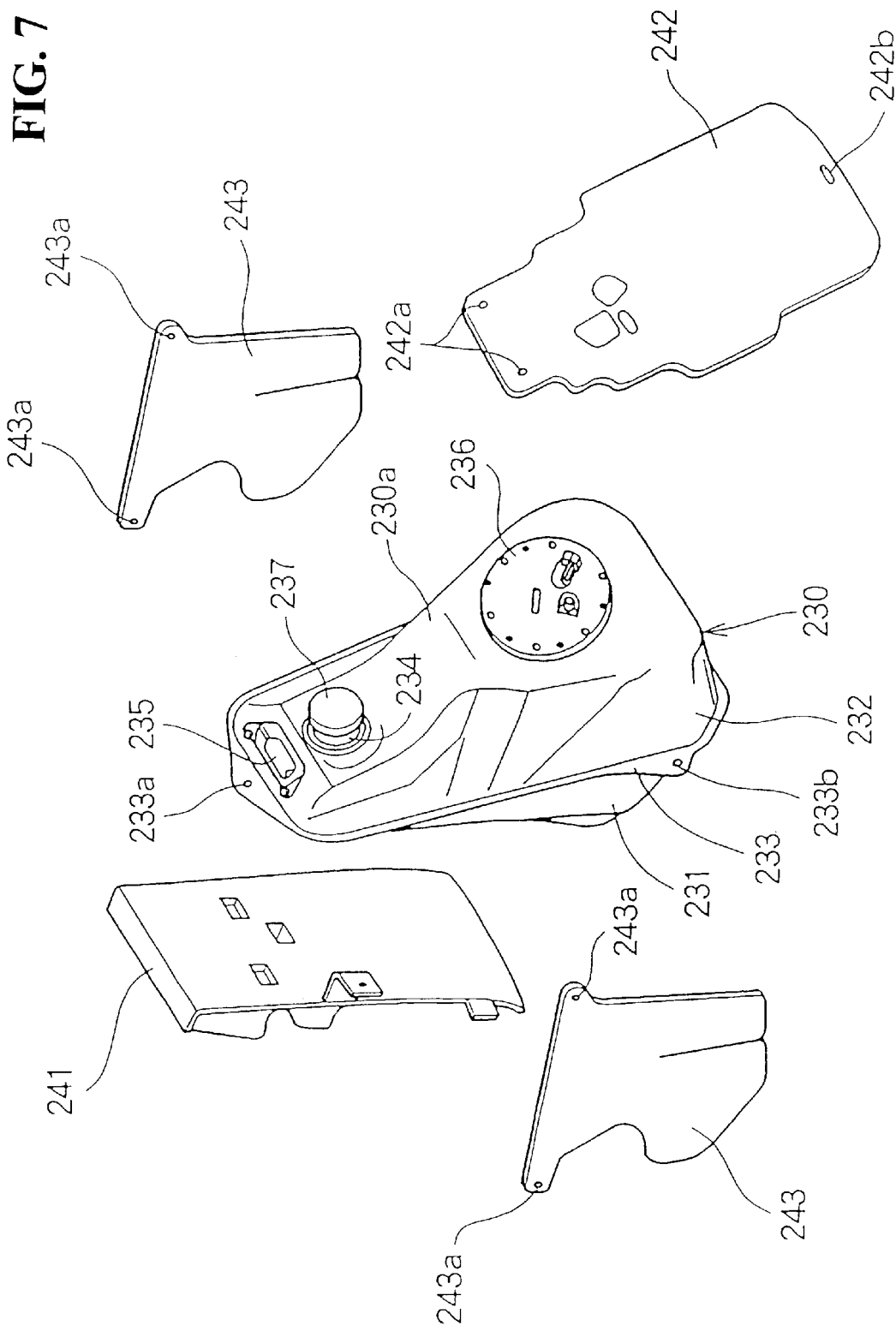
FIG. 7 is a perspective view of the fuel tank and adjacent parts of the motorcycle according to the present invention.

FIG. 7 is a perspective view of the fuel tank and adjacent parts of the motorcycle according to the present invention.

The fuel tank 230 is an integrated container formed by superimposing the lower half tank 231 to be located at the lower front half thereof and the upper half tank 232 to be located at the upper rear half thereof and joining at the flange 233 portion. The fuel tank 230 includes an oil filler port 234 on an inclined upper surface 230a, a sub-tank 235 for a breather, and a fuel feed pump 236. More specifically, the sub-tank 235 for a breather, the oil filler port 234, and the fuel feed pump 236 are arranged on the upper portion of the fuel tank 230 in this order from the front.

The flange 233 includes a mounting hole 233a at the center of the upper portion and two mounting holes 233b each on the left and right lower portions (only one of the holes on the left is shown in the figure). The oil filler port 234 includes a seal cap 237. The sub-tank 235 for a breather is a small container in communication with the inside of the fuel tank 230.

The present invention is characterized in that the heat shielding plate for preventing thermal effect from the engine 211 (See FIG. 6) and the radiator 221 (See FIG. 6) is divided into four members represented by the reference numerals 241, 242, 243, 243. The divided heat shielding plates 241, 242, 243, 243 are arranged in the vicinity of the front surface, the rear surface, the left surface, and the right surface of the fuel tank 230 respectively.

Since the divided heat shielding plates 241, 242, 243, 243 are employed, the extent of thermal effect from the engine 211 and from the radiator 221 can be taken into consideration, and their size may be arbitrarily minimized depending on the configuration of each surface of the fuel tank 230. As a result, each heat shielding plate 241, 242, 243, 243 may be relatively small in size, and may be manufactured extremely easily. In addition, since the molding die may be small in size and thus it requires only a small amount of material, the manufacturing cost may be reduced as well.

The front heat shielding plate 241 covering the front surface of the fuel tank 230 is a resin sheet of a hard resin or the like, which is substantially square in front view. Since the front heat shielding plate 241 is formed of a resin sheet, it is very simple in shape and may thus be manufactured at a lower cost.

The rear heat shielding plate 242 covering the rear surface of the fuel tank 230 is a rubber sheet, which is substantially square in shape, and includes two hooking holes 242a, 242a at the upper left and right corners thereof, and one hooking hole 242b at the bottom thereof.

The left and right heat shielding plates 243, 243 for covering the lower half portion of the left surface and the lower half portion of the right surface of the fuel tank 230 are formed of rubber sheets having two hooking holes 243a, 243a at the upper left and right corners thereof.

As described above, the rear heat shielding plate 242 and the left and right heat shielding plates 243, 243 are freely deformable and freely arranged depending on the space around the fuel tank 230 because they are formed of rubber sheets. It can also be arranged easily using a small space around the fuel tank 230 effectively. In addition, since the rear heat shielding plate 242 and the left and right heat shielding plates 243, 243 formed of sheets are employed, they may be very simple in shape and may be manufactured at lower cost.

Referring back to FIG. 6, the description will be continued.

The front heat shielding plate 241 is a member which also serves as a cooling air guide of the radiator 221. The front heat shielding plate 241 is disposed between the down tube 114 extending downward from the head pipe 111 and the fuel tank 230, and is detachably mounted on the front cross member 151. Therefore, the upper end of the front heat shielding plate 241 is curved toward the upper portion of the radiator 221, and the lower end of the front heat shielding plate 241 extends to the level below the radiator 221.

As described above, since the front heat shielding plate 241 is disposed between the down tube 114 and the fuel tank 230, the front heat shielding plate 241 can easily be mounted to the down tube 114. Therefore, the efficiency of the mounting operation of the front heat shielding plate 241 is ensured.

The rear heat shielding plate 242 can be detachably mounted on the vehicle body frame 110 by hooking the upper portion on the headed pin 144, and hooking the lower portion on the hook 148.

The left and right heat shielding plates 243, 243 (only the left one is shown in the figure) can be detachably mounted on the vehicle body frame 110 by hooking the upper portion on the headed pins 144.

As is clear from the description given so far, since the divided heat shielding plates 241, 242, 243, 243 are employed, each heat shielding plate 241, 242, 243, 243 can be mounted freely on the vehicle body frame 110 after the fuel tank 230 is mounted on the vehicle body frame 110 (vehicle body). Accordingly, the efficiency of mounting operation is ensured.

FIG. 6 also shows that the front lower cover 93 covers the front portion of the radiator 221 and the under cover 94 covers the lower portion of the radiator 221 and a front portion of the fuel tank 230.

The front lower cover 93 extends to the front end of the under cover 94 and is provided with a plurality of cooling air ports 93a for the radiator on its front surface.

The under cover 94 is provided with an exhaust air port 94a below the fan 224 for exhausting the exhaust air of the radiator 221 outward. The exhaust air port 94a is provided with a number of louvers (current plates) 94b obliquely facing toward the rear.

FIG. 6 also shows that the vehicle body cover 20 is provided with a lid 330 for the oil filler port that is to be opened when filling fuel via the oil filler port 234 into the fuel tank 230. Furthermore, a lid 360 is provided for inspection that is to be opened when the ignition plug (not shown) of the engine 211 is inspected.

Figure 8:
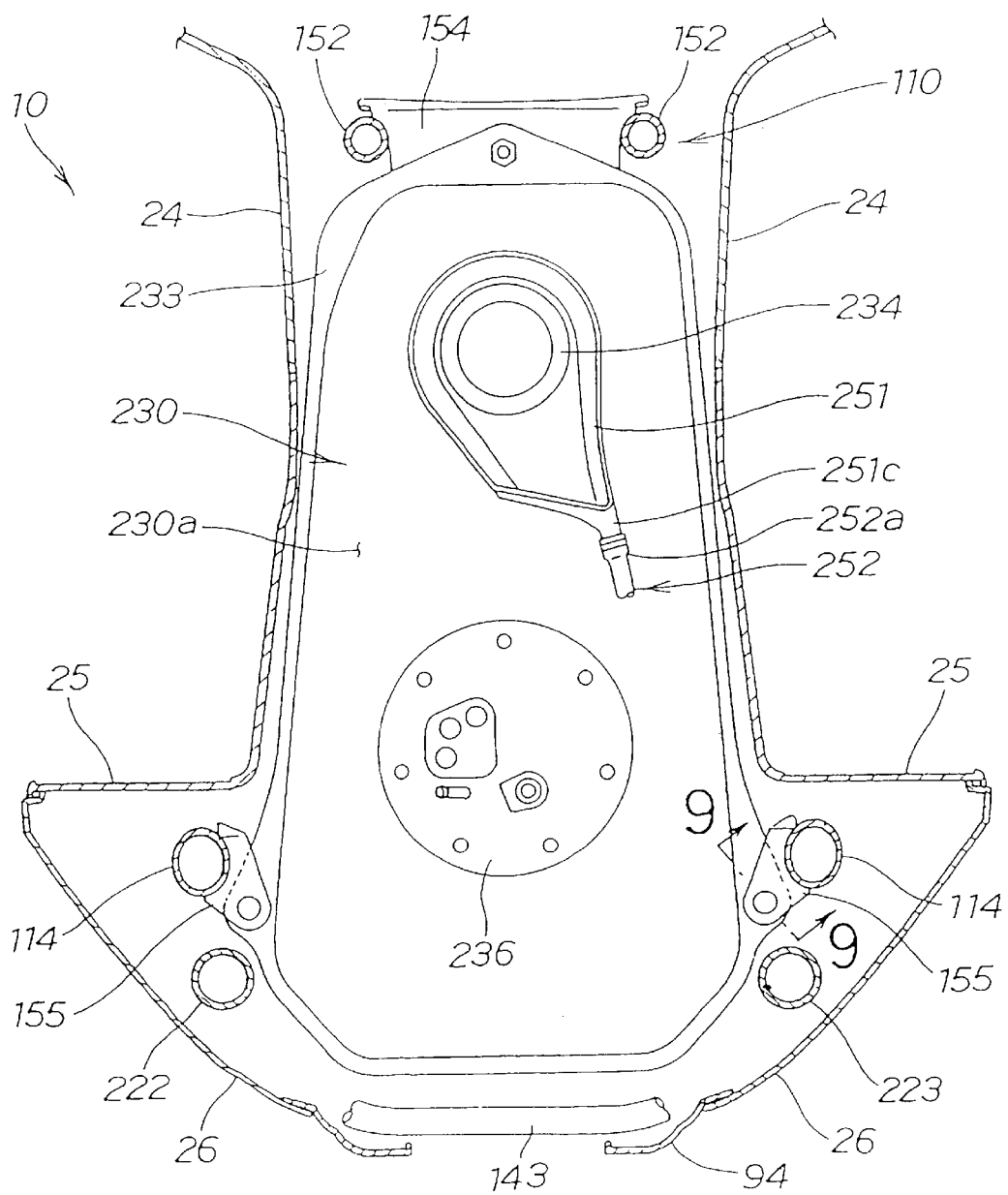
FIG. 8 is a view in the direction of the arrow 8 in FIG. 6.

FIG. 8 shows a mounting structure of the fuel tank 230 on the vehicle body frame 110 in the direction shown by the arrow 8 in FIG. 6.

The vehicle body frame 110 is formed by providing the upper bracket 154 between the left and right stays 152, 152, and mounting the lower brackets 155, 155 at the left and right down tubes 114, 114. The fuel tank 230 can be mounted detachably on the vehicle body frame 110 by securing the upper portion of the flange 233 of the fuel tank 230 to the upper bracket 154 with a bolt, and securing the lower portion of the flange 233 to the lower brackets 155, 155 with bolts. The upper portion of the flange 233 is tightly secured to the upper bracket 154 with bolt.

Figure 9:
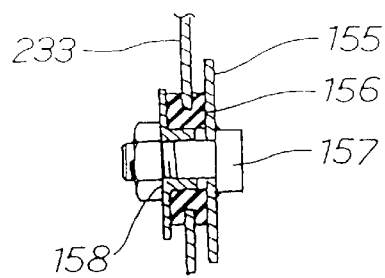
FIG. 9 is a cross sectional view taken along the line 9—9 in FIG. 8.

FIG. 9 is a cross sectional view taken along the line 9—9 in FIG. 8, and showing a state in which the lower portion of the flange 233 is rubber-mounted to the lower bracket 155 with a bolt and a screw nut 157 via a rubber bushing 156. The reference numeral 158 designates a collar.

Figure 10:
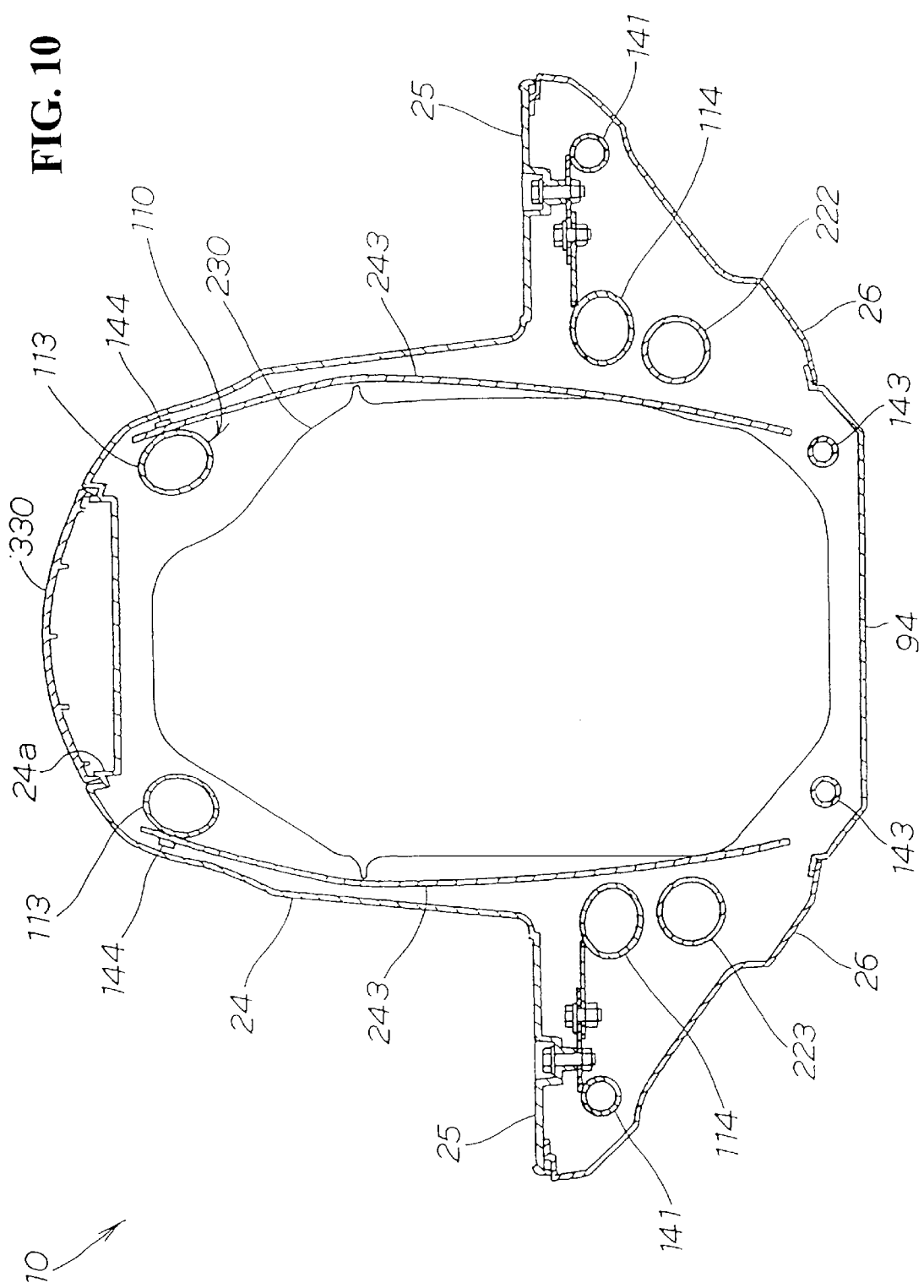
FIG. 10 is a front cross section of a motorcycle according to the present invention.

FIG. 10 is a front cross section of a motorcycle according to the present invention, showing a state in which (1) the vehicle body frame 110 and the fuel tank 230 are covered by the center cover 24, the left and right low deck floors 25, 25, the left and right floor skirts 26, 26, and the under cover 94, and (2) the low-deck floors 25, 25 are secured to the left and right down tubes 114, 114 via the floor supporting stays 141, 141 with bolts.

As described above, the left and right heat shielding plates 243, 243 hooked on the headed pins 144 extend downward alongside the fuel tank 230, and extend through the gaps between the side surfaces of the fuel tank 230 and the down tubes 114, 114. As is described thus far, since the upper portions of the left and right heat shielding plates 243, 243 must simply be hooked on the vehicle body frame 110, it can be mounted in a very simple manner.

Figure 11:
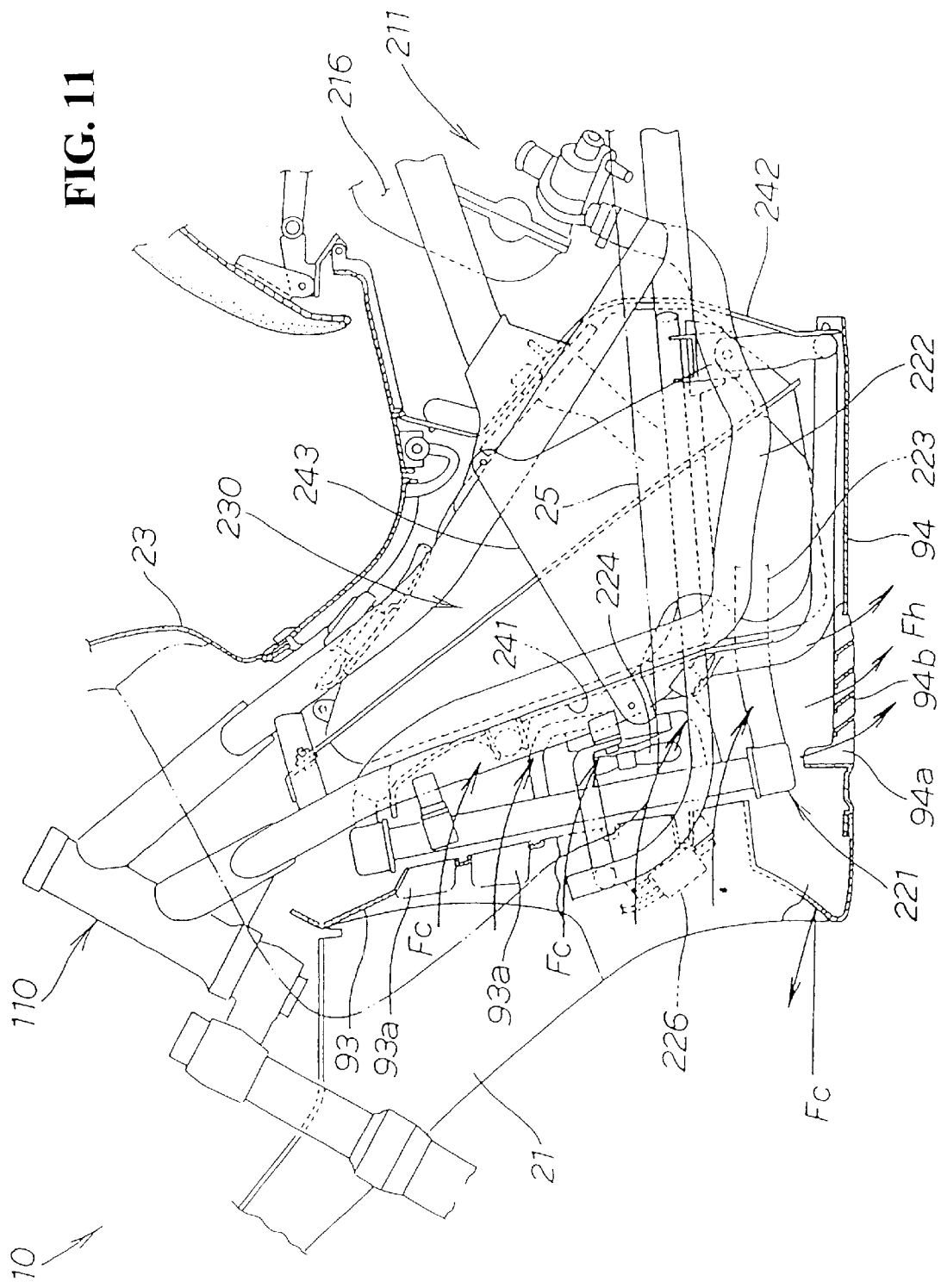
FIG. 11 is a view showing an action of the radiator and adjacent parts of the motorcycle according to the present invention.

FIG. 11 is a drawing showing an action of the radiator and adjacent parts of the motorcycle according to the present invention. A fan 224 located behind the radiator 221 introduces air from the front of the radiator 221. Therefore, the outside air is introduced into the cooling air induction ports 93a for the radiator as cooling air (including air blowing on the vehicle during travel) Fc, and flows through the cooling air passage into the radiator 221.

Hot air coming out from the radiator 221 (exhausted hot air) Fh is discharged through the fan 224, guided by the front heat shielding plate 241, which also serves as a cooling air guide, to change the flow into downward direction, and discharged from the air discharge port 94a of the under cover 94 toward the outside.

Since the direction of hot air Fh coming out from the radiator 221 is changed by the front heat shielding plate 241, the effect of hot air Fh on the engine 211 or the fuel tank 230 located behind the radiator 221 can be prevented. Since the front heat shielding plate 241 also serves as a cooling air guide, provision of a separate cooling air guide is not necessary.

Figure 12:
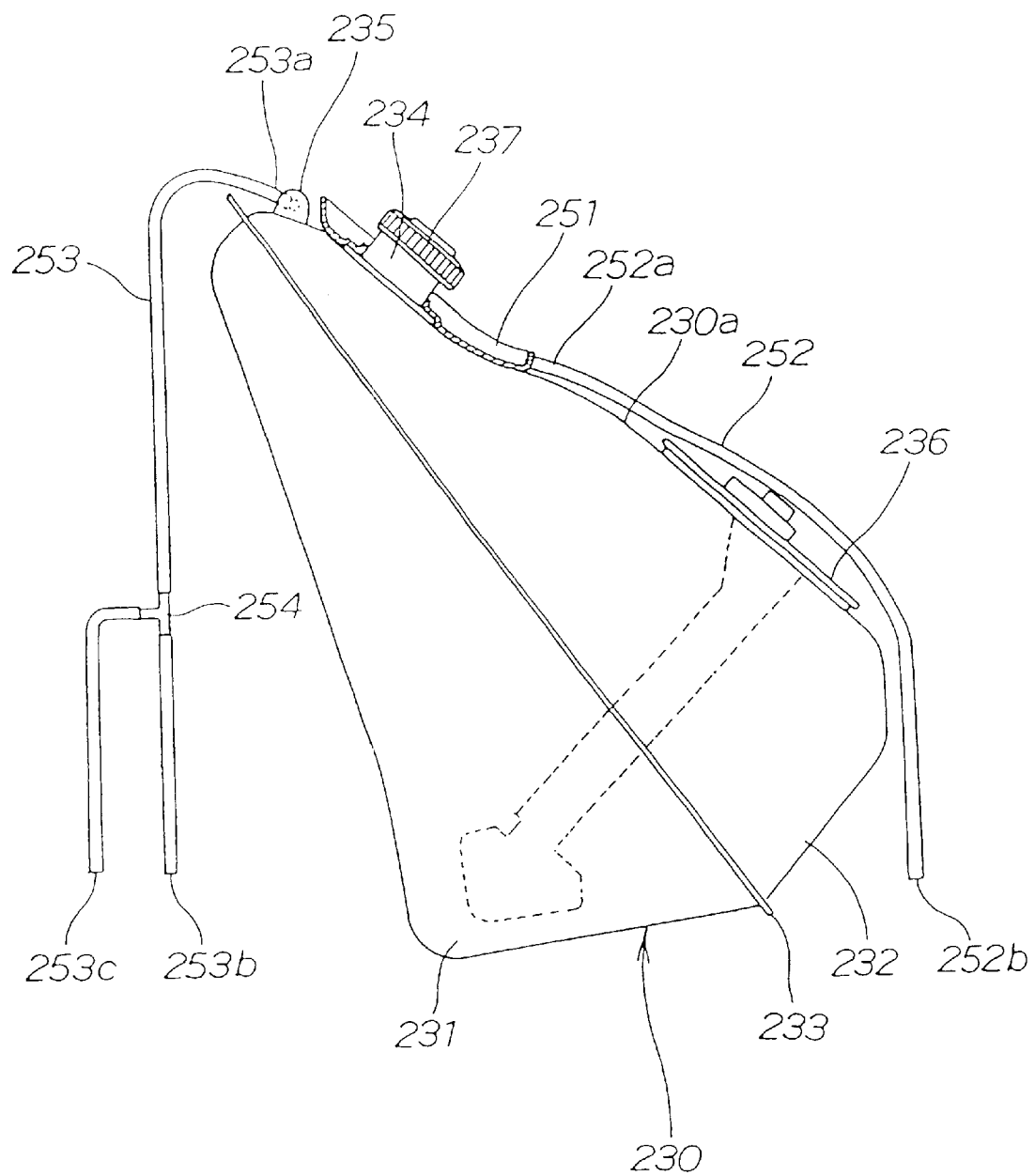
FIG. 12 is a diagrammatic sketch of the fuel tank of the motorcycle according to the present invention.

FIG. 12 is a diagrammatic sketch of the fuel tank of the motorcycle according to the present invention, showing a state in which the fuel tank 230 is provided with a tray 251 surrounding the oil filler port 234. One end 252a of the fuel discharge hose (drain hose) 252 is connected to the tray 251, and the other end 252b of the fuel discharge hose 252 is opened in the air.

An end 253a of the breather hose 253 is connected to the sub-tank 235 for a breather, and the other end of the breather hose 253 are bifurcated 253b, 253c. The reference numeral 254 designates a T-joint for bifurcating the other end of the breather hose 253.

Figure 13:
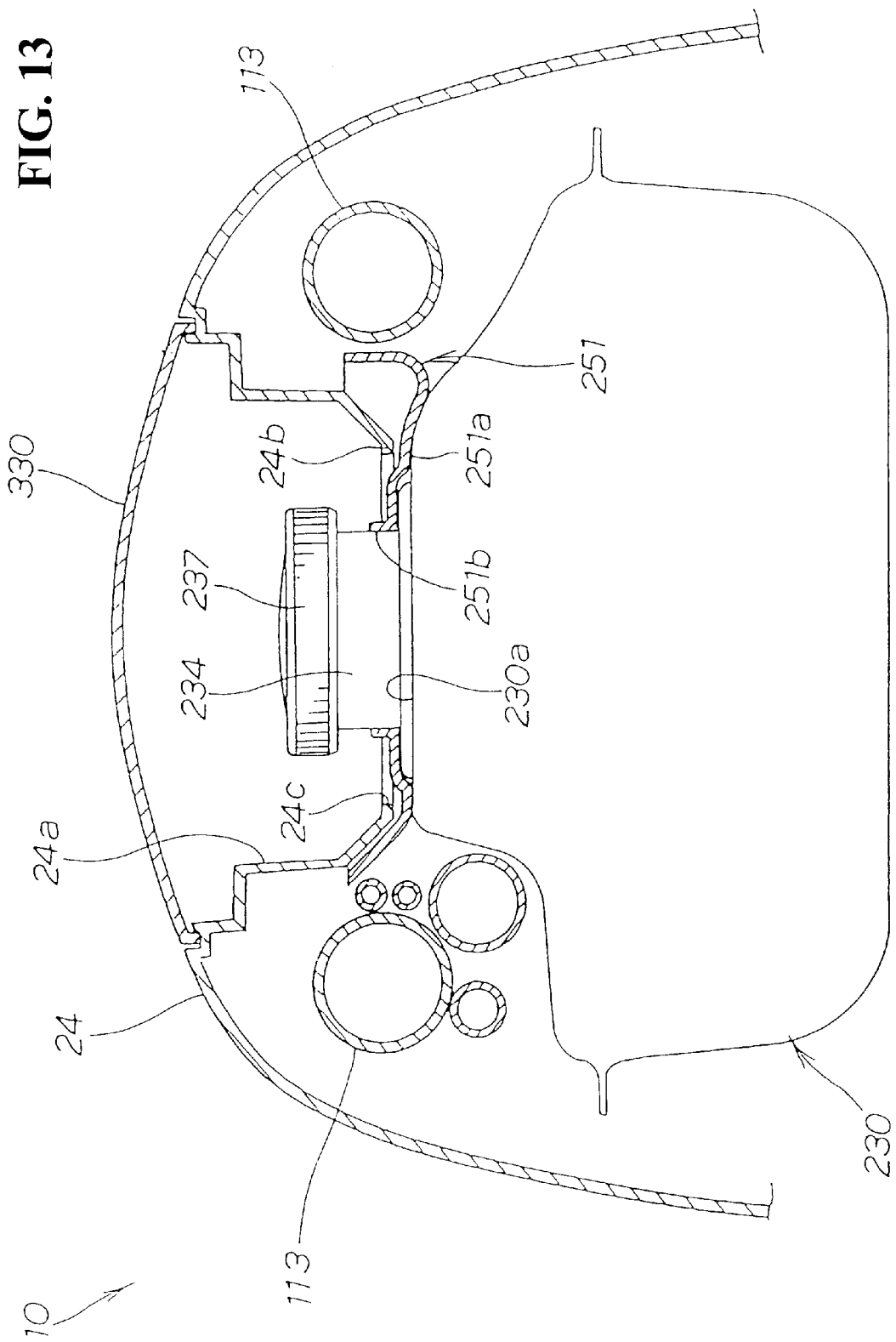
FIG. 13 is a sectional back view showing the oil filler port of the fuel tank and adjacent parts of the motorcycle according to the present invention.

FIG. 13 is a sectional back view showing the oil filler port of the fuel tank and adjacent parts of the motorcycle according to the present invention. The tray 251 is a fuel pan having a flat bottom 251a and a cylindrical portion 251b passing vertically therethrough formed in a single piece. The tray 251 can be mounted simply by inserting the cylindrical portion 251b into the oil filler port 234 and having the upper and lower surfaces of the bottom 251a captured between the bottom 24b of the recess 24a provided at the oil filling section of the center cover 24 and the upper surface 230a of the fuel tank 230. Therefore, the members such as bolts or the like for mounting the tray 251 is not necessary, and thus it may be mounted easily. The reference numeral and sign 24c designate a through hole for the oil filler port.

Figure 14:
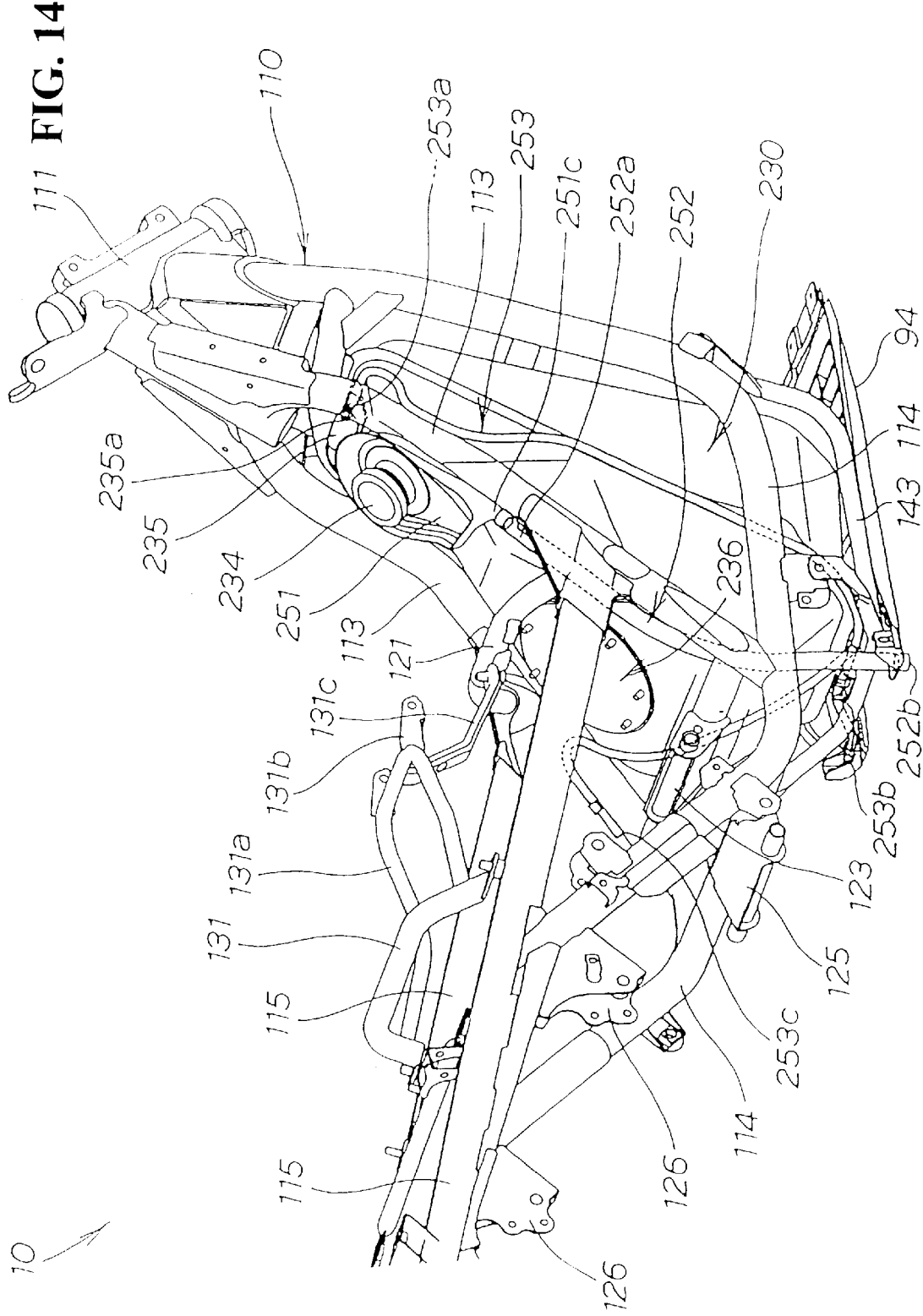
FIG. 14 is a perspective view showing the right side of the vehicle body frame and the fuel tank of the motorcycle according to the present invention.

FIG. 14 is an external view showing the right side of the vehicle body frame and the fuel tank of the motorcycle according to the present invention. The tray 251 includes a discharge port 251c extending downward toward the rear. One end 252a of the fuel discharge hose 252 is connected to the discharge port 251c. The fuel discharge hose 252 extends downward along the right upper frame 113 to the right end of the rear portion of the under cover 94, and the other end 252b is directed downward.

Fuel spilled around the oil filler port 234 during fueling into the fuel tank 230 may be collected on the tray 251 and discharged via the fuel discharge hose 252 to the outside. Therefore, spilled fuel will never be attached to the exterior surface of the fuel tank.

On the other hand, the sub-tank 235 for a breather comprises a breather port 235a extending along the right side. The breather hose 253 is connected to the breather port 235a at one end 253a thereof and is extended downward toward the rear along the right side of the fuel tank 230.

That is, when viewing the fuel tank 230 from the front, the breather hose 253 passes between the upper frame 113 and the down tube 114, extends along the fuel tank 230 to the right end of the rear portion of the under cover 94, and then is bifurcated.

One end of the bifurcated branch 253b extends to the left end of the rear portion of the under cover 94 and is opened in the air. The other end of the bifurcated branch 253c extends upward once along the rear surface of the fuel tank 230, and then rearward along the left upper frame 113, and is opened into the air.

In the aforementioned embodiment of the present invention, the ignition coil 226 shown in FIG. 6 must simply be arranged on the opposite side of the return pipe 222 with respect to the center of the vehicle width. For example, when the return pipe 222 is laid on the right side with respect to the center of the vehicle width, the ignition coil 226 is to be arranged on the left side.

Figure 15:
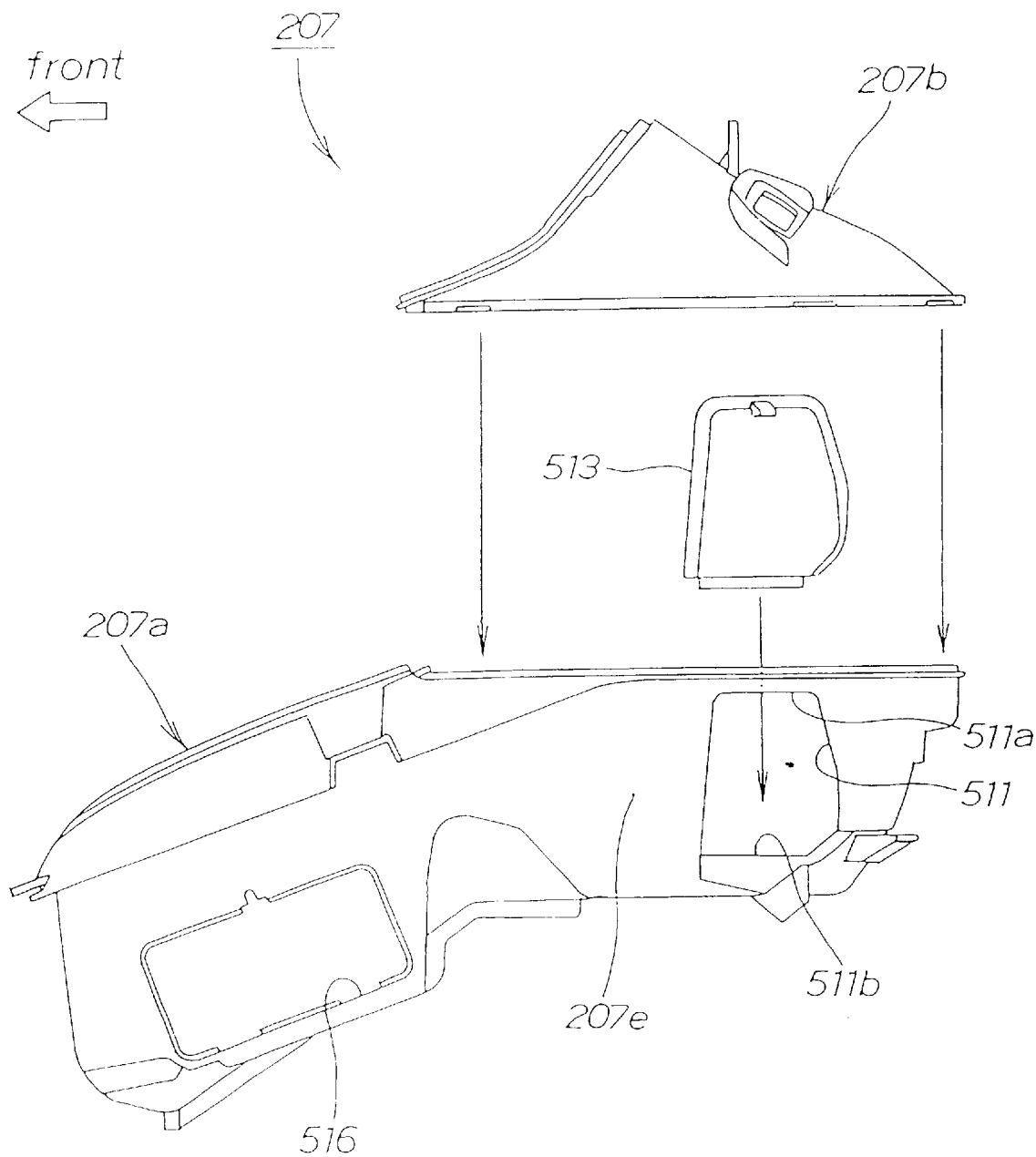
FIG. 15 is a side view of the storage box of the motorcycle according to the present invention.

FIG. 15 is a side view of the storage box of the motorcycle according to the present invention, in which the outline arrow (front) in the figure designates the frontward of the vehicle (hereinafter).

The storage box 207 is constructed by forming access openings 511, 512 (the access opening on the far side 512 is not shown) for doing maintenance of the bulb for the rear combination lamp 267 (See FIG. 1) on the rear left wall 207e and rear right wall 207f (the rear right wall 207f is located on the far side of the rear left wall 207e, and thus not shown) of the lower box 207a respectively, closing these access openings 511, 512 with lids 513, 514 (the lid on the far side 514 is not shown), and mounting the upper box 207b on the upper rear of the lower box 207a. The reference numeral and sign 511a, 511b designate the upper side and the lower side of the access opening 511, the numeral 516 designates a battery inserting hole for inserting the battery 286 (See FIG. 3).

Since the access opening 512 with the lid 514 and the access opening 511 with the lid 513 are symmetrical in shape, further detailed description will not be made.

Figure 16:
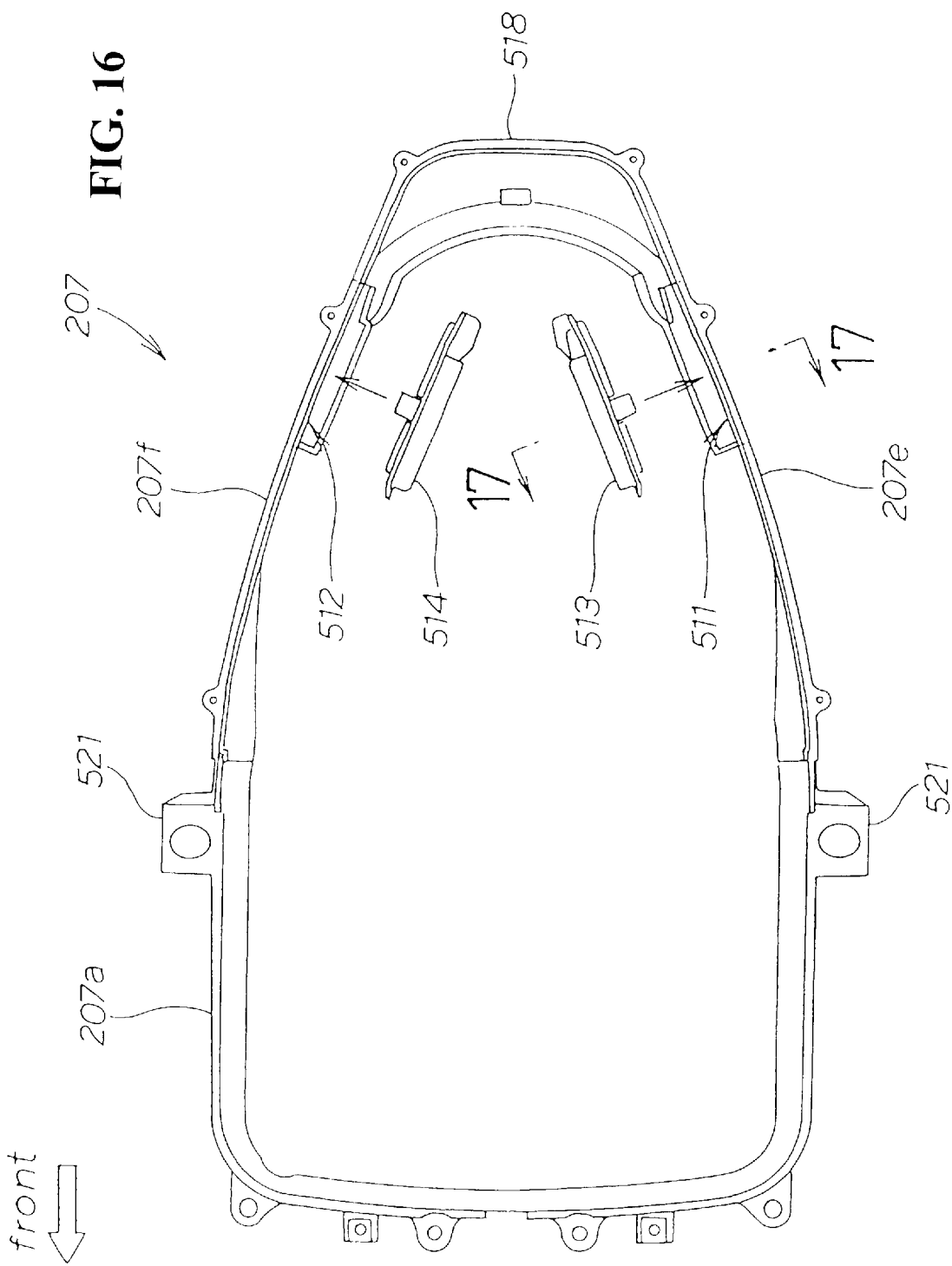
FIG. 16 is a plan view of the storage box of the motorcycle according to the present invention.

FIG. 16 is a plan view of the storage box of the motorcycle according to the present invention, showing a state in which the rear left wall 207e and the rear right wall 207f fanning out toward the front are provided at the rear of the lower box 207a of the storage box 207. The access openings 511, 512 are provided on the rear left wall 207e and the rear right wall 207f, respectively. The lids 513, 514 are attached to the access openings 511, 512 respectively. The reference numeral 518 designates a rear wall of the lower box 207a, and the reference numerals 521, 521 designate a vehicle body frame mounting portion provided on the lower box 207a for mounting the lower box 207a to the vehicle body frame 110 (See FIG. 4).

Figure 17:
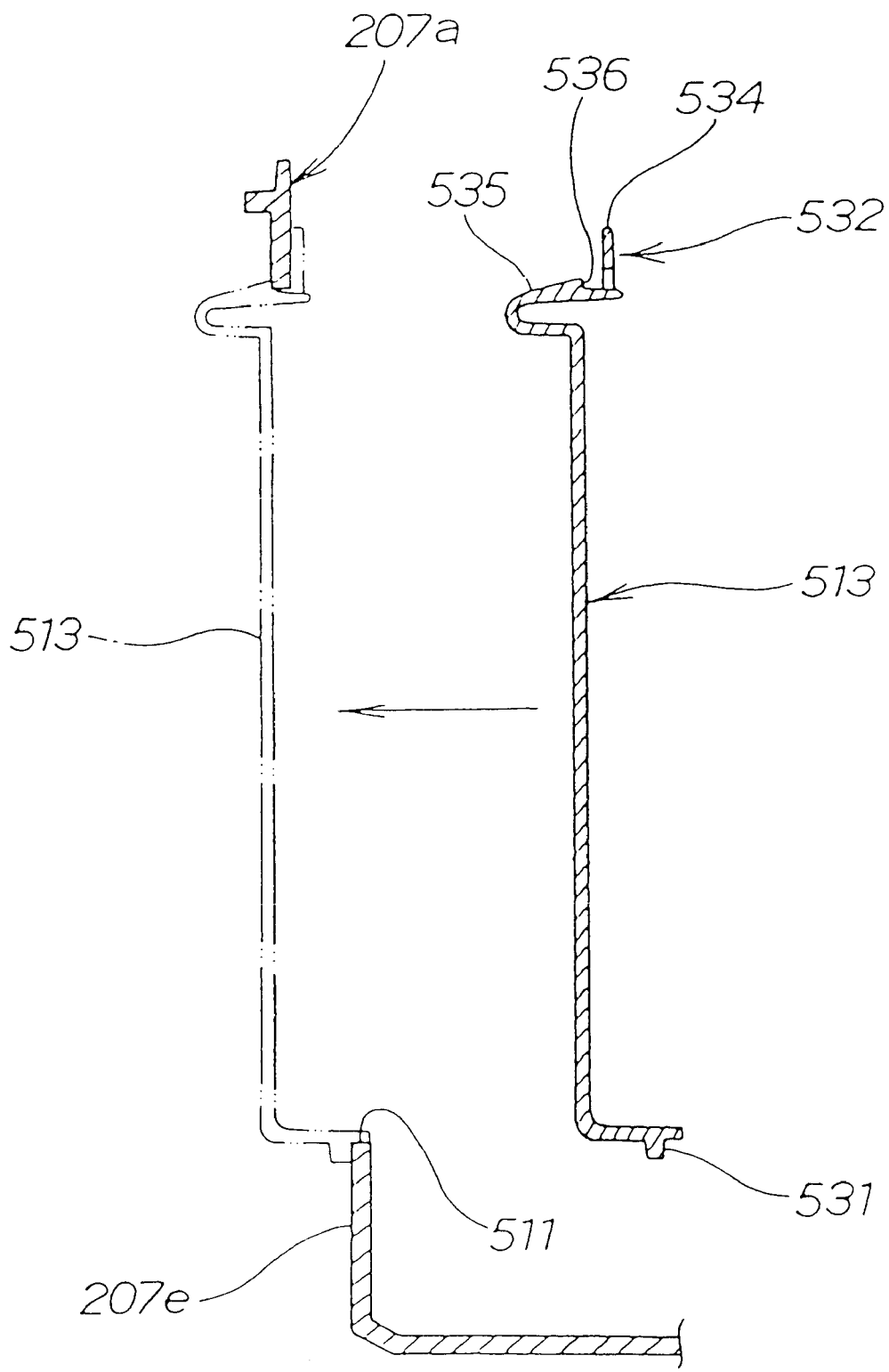
FIG. 17 is a cross sectional view taken along the line 17—17 in FIG. 16.

FIG. 17 is a cross sectional view taken along the line 17—17 in FIG. 16, showing a state in which the lid 513 is attached on the access opening 511 provided on the rear left wall 207e of the lower box 207a.

The lid 513 includes a lower catch 531 to be caught on the lower side of the access opening 511, and an upper catch 532 to be caught on the upper side of the access opening 511. The upper catch 532 is fitted on the upper side of the access opening 511 by holding a fingerhold 534 and bending a U-shaped portion 535 to fit the upper side of the access opening 511 into the recess 536. The lid 513 is mounted on the access opening 511 by first hooking the lower catch 531 on the lower side of the access opening 511, and then hooking the upper catch 532 on the upper side of the access opening 511.

Figure 18:
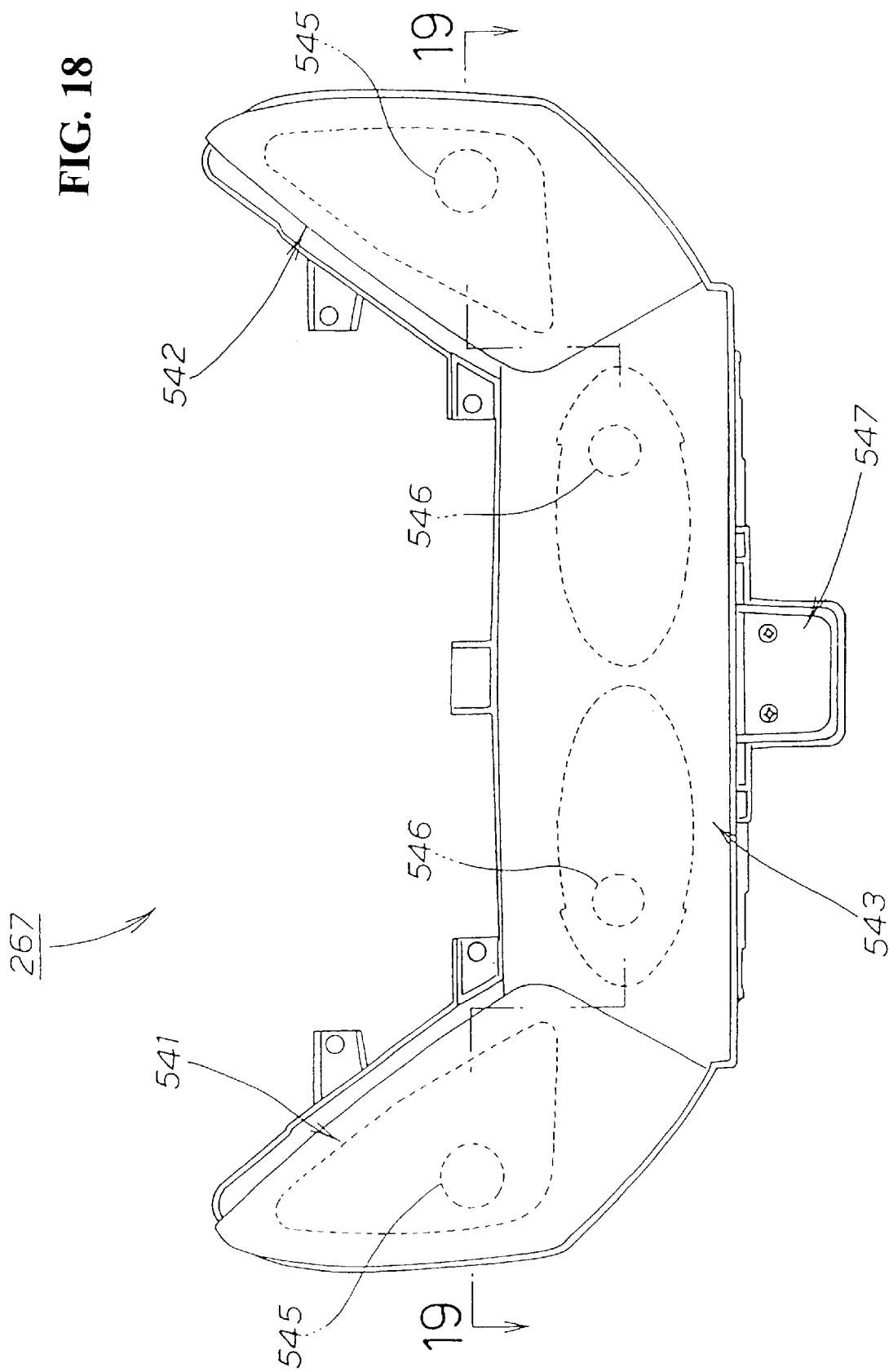
FIG. 18 is an explanatory drawing of the rear combination lamp of the motorcycle according to the present invention.

FIG. 18 is an explanatory drawing of the rear combination lamp of the motorcycle according to the present invention, in a state in which the rear combination lamp 267 is viewed from the rear side of the vehicle.

The rear combination lamp 267 includes rear turn signal lamps 541, 542 at the upper left position and at the upper right position, and a laterally elongated tail lamp 543 which also serve as a stop lamp at the lower central position. The reference numerals 545, 545 designate bulbs for the rear turn signal lamp, the numerals 546, 546 designates bulbs for the tail lamp and stop lamp, and the numeral 547 designate a license lamp provided under the rear combination lamp 267.

Figure 19:
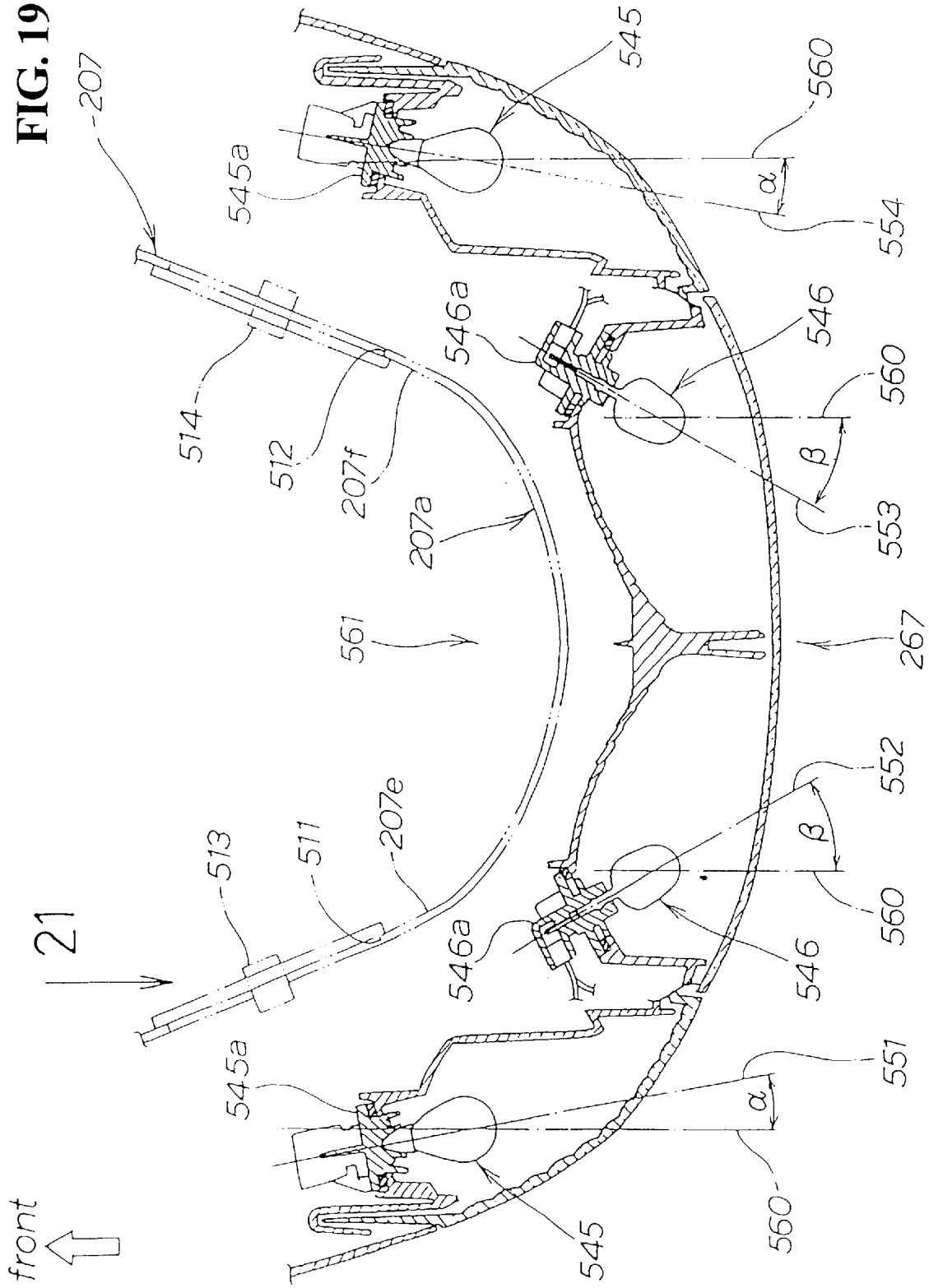
FIG. 19 is a cross sectional view taken along the line 19—19 in FIG. 18.

FIG. 19 is a cross sectional view taken along the line 19—19 in FIG. 18, showing a state in which the lamp axes 551, 552, 553, 554 of the respective bulbs 545, 546, 546, 545 of the rear combination lamp 267 are respectively inclined with respect to the elongated axes 560 of the vehicle body extending in the fore-and-aft direction of the vehicle.

In other words, the bulbs 545 are oriented in such a manner that the lamp axes 551, 554 are inclined by the angle α toward the center of the width of the vehicle body with respect to the longitudinal axis 560 of the vehicle body, and the lamps 546 are oriented in such a manner that the lamp axes 552, 553 are inclined by the angle β with respect to the longitudinal axis 560 of the vehicle body. The angle β is set to be a larger angle of gradient than the angle α, so that the storage box 207 is placed closer to the rear combination lamp 267 to increase the volume of the storage box 207.

The lamp axes 551, 552, 553, 554 are axes passing through the centers of the screw bases 545*a*, 546*a*, 546*a*, 545*a* of the bulb 545, 546, 546, 545 respectively.

Therefore, the lamp axes 551, 554 of the two bulbs 545, 545 fan out toward the front, and the lamp axes 552, 553 of the two bulbs 546, 546 fan out toward the front as well.

In this way, by fanning out the lamp axes 551, 554 of the bulbs 545, 545 and the lamp axes 552, 553 of the bulbs 546, 546 respectively, a large massed space 561 can be reserved between the left and right bulbs 545, 545 and between the left and right bulbs 546, 546. In other words, a space that can be utilized more effectively is obtained.

Therefore, the rear portion of the storage box 207 may be extended toward the rear, so that the volume of the storage box 207 may be increased.

By inclining the lamp axes 551, 552, 553, 554, the bulbs 545, 546 may be placed along the outline of the combination lamp 267, and thus the distance between the bulbs 545 and 545 and between the bulbs 546 and 546 may be laterally increased, whereby visibility of the rear combination lamp 267 may be further improved, and the storage 207 can be extended rearwardly of the position between the bulbs 545, 545 so that the volume of the storage box 207 is increased.

In addition, by providing the access openings 511, 512 on the rear left wall 207*e* and the rear right wall 207*f* of the lower box 207*a* of the storage box 207, the bulbs 545, 546 may be replaced easily from the inside of the storage box 207 by removing the lids 513, 514. Since the access openings 511, 512 are provided on the left and right sides of the rear portion of the storage box 207, the load exerted by the rearward movement of the stored objects at the time of acceleration of the vehicle on the left and right access openings 511, 512 may be reduced, and thus the access openings 511, 512 may be upsized to improve maintenance.

The operation of the aforementioned vehicle rear structure will be described below.

Figure 20:
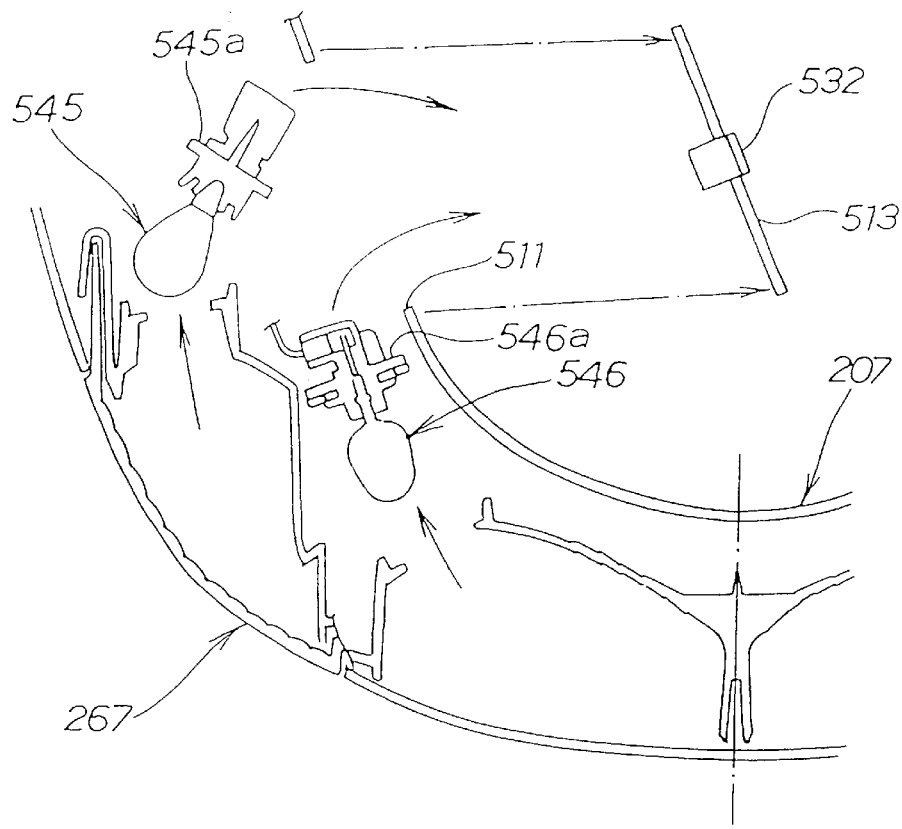
FIG. 20 is a first illustration explaining the action of the vehicle rear structure according to the present invention.

FIG. 20 is a first illustration explaining the action of the vehicle rear structure according to the present invention.

For example, on burning out, the bulbs 545, 546 of the rear combination lamp 267 may be replaced by placing the finger on the upper catch 532 of the lid 513 and removing the lid 513, inserting the hand into the access opening 511 from inside the storage box 207, holding and turning the screw bases 545*a*, 546*a* of the bulb 545, 546 with fingers to release the lock, and taking them out from the access opening 511 as shown by the arrow. Subsequently, the new bulbs 545,546 are mounted in reverse sequence from the above-mentioned sequence.

In this way, maintenance of the bulbs 545, 546 may easily be performed, and thus it is not necessary to perform maintenance by removing the rear combination lamp by loosening screws, or by inserting the hand via the space between the storage box and the rear combination lamp.

Figure 21:
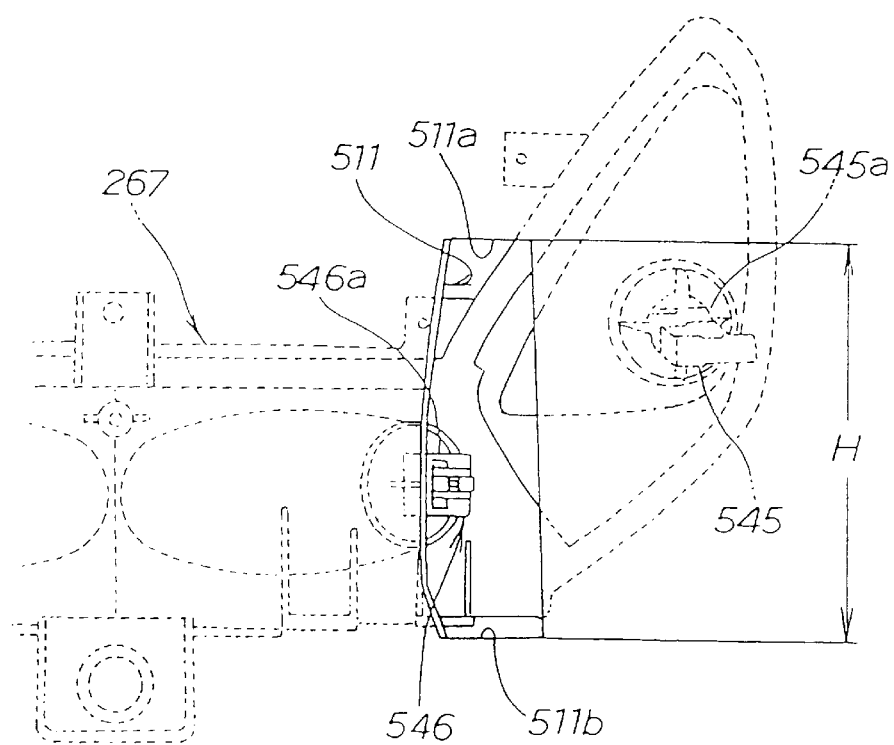
FIG. 21 is a second illustration explaining the action of the vehicle rear structure according to the present invention in the direction of the arrow 21 in FIG. 19.

FIG. 21 is a second illustration explaining the action of the vehicle rear structure according to the present invention, showing a state in which the back face of the rear combination lamp 267 from the inside of the storage box through the access opening 511 is viewed in the direction of the arrow 21 in FIG. 19.

By disposing the upper side 511*a* of the access opening 511 at the position higher than the bulb 545 and disposing the lower side 511*b* at the position lower than the bulb 546 to establish the height H of the access opening 511, maintenance of the bulbs 545, 546 is improved according to the present invention.

In other words, in order to replace the bulb 546, the hand must simply be inserted straight through the position of the access opening 511 slightly lower than the center, and in order to replace the bulb 545, the hand must simply be inserted through the upper portion of the access opening 511 toward the right (in FIG. 19, from the front of the access opening 511 straight ahead).

As is described in conjunction with FIG. 3, FIG. 16 and FIG. 19, the present invention is a rear structure of the motorcycle 10 including a storage box 207 disposed below the hinged seat 208, and a rear combination lamp 267 disposed at the back of the storage box 207. According to a first aspect of the present invention, the rear combination lamp 267 is set closer to the storage box 207 by providing pairs of left and right bulbs 545, 545 and the bulbs 546, 546 on the rear combination lamp 267, forming the left and right access openings 511, 512 for performing maintenance of these bulbs 545, 545, 546, 546 on the lower box 207*a*, and closing these access opening 511, 512 with the lids 513, 514 respectively.

By providing the left and right access openings 511, 512 for performing maintenance of the bulbs 545, 546 on the lower box 207*a*, maintenance work such as replacing the bulbs 545, 546 from the inside of the storage box 207 can easily be performed, and the rear combination lamp 267 can be set closer to the storage box 207, whereby the rear portion of the vehicle may be made compact and slim in configuration even when a large rear combination lamp is disposed rearward of a large storage box.

According to a second aspect of the present invention, the lamp axes 551, 552, 553, 554 passing through the centers of the respective bulbs 545, 545, 546, 546 are inclined with respect to the longitudinal axis 560 of the vehicle body.

By inclining the lamp axes 551, 552, 553, 554 with respect to the longitudinal axis 560 of the vehicle body, for example, the lamp axes 551, 552, 553, 554 may be inclined to the direction in which maintenance of the bulbs 545, 546 may easily be performed through the access openings 511, 512. Therefore, maintenance is improved.

According to a third aspect of the present invention, the left and right lamp axes 551, 554 and the lamp axes 552, 553 are respectively fanned out toward the front.

By fanning out the respective left and right lamp axes 551, 554 and the lamp axes 552, 553 toward the front, a large massed space 561 can be reserved between the left and right bulbs 545, 545 and between the left and right bulbs 546, 546 of the rear combination lamp 267. Thus, the storage box 207 can be extended toward the rear, so that the volume of the storage box 207 may be increased.

Since the lids 513, 514 are provided on the left and right of the storage box 207, for example, even when a rearward load is exerted on the stored objects in the storage box 207 at the time of acceleration of the vehicle, the load does not act on the lids 513, 514. Therefore, in comparison for example with a storage box having a lid at the rear wall of the storage box, it is not necessary to employ a rigid structure in the lids 513, 514 according to the present invention.

Though the lamp axes of the bulbs are inclined in the horizontal plane in the embodiment of the present invention, it is not limited thereto, and the lamp axes of the bulbs may be inclined in the vertical plane as well as in the horizontal plane. Accordingly, the screw bases of the bulbs may be oriented toward the center of the access openings, and thus maintainability of the bulbs may further be increased.

The present invention with the aforementioned construction will provide the following advantages.

In the vehicle rear structure according to the first aspect of the present invention, the rear combination lamp is set closer to the storage box by providing pairs of left and right bulbs on the rear combination lamp and forming the left and right access openings for performing maintenance of these bulbs, and closing the access openings with the lids. Accordingly, maintenance work such as replacing the bulbs from the inside of the storage box can easily be performed, and the rear combination lamp may be set closer to the storage box, whereby the rear portion of the vehicle may be formed compact in configuration even when a large rear combination lamp is disposed rearward of the large storage box.

Therefore, the width or the entire length of the rear portion of the vehicle does not increase, and thus appearance and operability of the vehicle are improved.

In the vehicle rear structure according to the second aspect of the present invention, since the lamp axes passing through the centers of the bulbs are inclined with respect to the longitudinal axis of vehicle body, for example, the lamp axes can be inclined to the orientation in which maintenance work of the bulbs can easily be performed through the access openings. Therefore, workability is improved.

In the vehicle rear structure according to the third aspect of the present invention, since the left and right lamp axes are fanned out toward the front, a large space may be reserved between the left and right bulbs of the rear combination lamp, and the storage box can be extended toward the rear, so that the volume of the storage box may be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle rear structure, comprising:
    a storage box disposed below a hinged seat; and
    a rear combination lamp disposed at a rear of the storage box,
    wherein the rear combination lamp is set closer to the storage box by providing a pair of left and right bulbs on the rear combination lamp, forming left and right access openings for performing maintenance of the bulbs on the storage box, and closing the access openings with lids.

2. The vehicle rear structure according to claim 1, wherein lamp axes passing through a center of each of the left and right bulbs are inclined with respect to a longitudinal axis of a vehicle body.

3. The vehicle rear structure according to claim 2, wherein said left and right lamp axes are directed so as to fan out toward a front of a vehicle.

4. The vehicle rear structure according to claim 1, wherein said storage box includes an upper box portion and a lower box portion removably connected thereto, said lower box portion including a rear wall, a left side wall and a right side wall, said left and right access openings being formed in said lower box portion in said left side wall and said right side wall, respectively.

5. The vehicle rear structure according to claim 4, wherein said left side wall includes a battery inserting hole formed therein for receiving a battery.

6. The vehicle rear structure according to claim 1, wherein each of said lids comprises:
    a lower catch for engaging a lower side of each of said left and right access opening, respectively; and
    an upper catch for engaging an upper side of each of said left and right access openings, respectively, said upper catch including a fingerhold, a bendable U-shaped portion and a recess formed between said fingerhold and said U-shaped portion, said upper side of each of said left and right access openings respectively engaging in said recess.

7. The vehicle rear structure according to claim 1, wherein said rear combination lamp comprises:
    left and right rear turn signal lamps located at upper left and right positions thereof, respectively, said left and right rear turn signal lamps including left and right turn signal bulbs mounted therein, respectively; and
    a laterally elongated tail lamp located at a lower central position thereof, said tail lamp including left and right tail lamp bulbs mounted therein.

8. A vehicle rear structure, comprising:
    a storage box, said storage box being disposed below a hinged seat and including left and right access openings formed therein;
    a pair of left and right lids for closing said left and right access openings, respectively; and
    a rear combination lamp, said rear combination lamp being disposed at a rear of said storage box and including a pair of left and right bulbs mounted thereon, said pair of left and right bulbs being accessed through said left and right access openings, respectively.

9. The vehicle rear structure according to claim 8, wherein lamp axes passing through a center of each of the left and right bulbs are inclined with respect to a longitudinal axis of a vehicle body.

10. The vehicle rear structure according to claim 9, wherein said left and right lamp axes are directed so as to fan out toward a front of a vehicle.

11. The vehicle rear structure according to claim 8, wherein said storage box includes an upper box portion and a lower box portion removably connected thereto, said lower box portion including a rear wall, a left side wall and a right side wall, said left and right access openings being formed in said lower box portion in said left side wall and said right side wall, respectively.

12. The vehicle rear structure according to claim 11, wherein said left side wall includes a battery inserting hole formed therein for receiving a battery.

13. The vehicle rear structure according to claim 8, wherein each of said left and right lids comprises:
    a lower catch for engaging a lower side of each of said left and right access opening, respectively; and
    an upper catch for engaging an upper side of each of said left and right access openings, respectively, said upper catch including a fingerhold, a bendable U-shaped portion and a recess formed between said fingerhold and said U-shaped portion, said upper side of each of said left and right access openings respectively engaging in said recess.

14. The vehicle rear structure according to claim 8, wherein said rear combination lamp comprises:
    left and right rear turn signal lamps located at upper left and right positions thereof, respectively, said left and right rear turn signal lamps including left and right turn signal bulbs mounted therein, respectively; and
    a laterally elongated tail lamp located at a lower central position thereof, said tail lamp including left and right tail lamp bulbs mounted therein.

15. A method of setting a rear combination lamp closer to a storage box in a vehicle, said method comprising the steps of:

providing a vehicle rear structure including the storage box disposed below a hinged seat, and the rear combination lamp disposed at a rear of the storage box;

providing a pair of left and right bulbs on the rear combination lamp;

forming left and right access openings in the storage box for performing maintenance of the bulbs; and closing the left and right access openings with left and right lids, respectively.

16. The method according to claim 15, further comprising the step of inclining lamp axes passing through a center of each of the left and right bulbs with respect to a longitudinal axis of the vehicle.

17. The method according to claim 16, further comprising the step of directing the left and right lamp axes so as to fan out toward a front of the vehicle.

18. A method of increasing the storage capacity of a storage box in a vehicle, said method comprising the steps of:

providing a vehicle rear structure including the storage box disposed below a hinged seat, and a rear combination lamp disposed at a rear of the storage box;

providing a pair of left and right bulbs on the rear combination lamp;

forming left and right access openings in the storage box for performing maintenance of the bulbs; and closing the left and right access openings with left and right lids, respectively.

19. The method according to claim 18, further comprising the step of inclining lamp axes passing through a center of each of the left and right bulbs with respect to a longitudinal axis of the vehicle.

20. The method according to claim 19, further comprising the step of directing the left and right lamp axes so as to fan out toward a front of the vehicle.

* * * * *